(12) United States Patent
Hung

(10) Patent No.: US 7,972,041 B2
(45) Date of Patent: Jul. 5, 2011

(54) LIGHT EMITTING DIODE PACKAGE AND LIGHT GUIDE PIPE AND BACKLIGHT MODULE AND LIQUID CRYSTAL DISPLAY DEVICE USING THE SAME

(75) Inventor: Chen-Pin Hung, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 12/466,424

(22) Filed: May 15, 2009

(65) Prior Publication Data

US 2009/0219463 A1 Sep. 3, 2009

Related U.S. Application Data

(62) Division of application No. 11/457,595, filed on Jul. 14, 2006, now Pat. No. 7,553,045.

(30) Foreign Application Priority Data

Jul. 19, 2005 (TW) .............................. 94124414 A

(51) Int. Cl.
*F21V 5/00* (2006.01)

(52) U.S. Cl. .................... 362/327; 362/337; 362/556

(58) Field of Classification Search .................. 362/26, 362/27, 551, 555, 556, 612, 615, 327, 329, 362/334, 335, 336, 337, 338, 340

See application file for complete search history.

(56) References Cited

U.S. PATENT DOCUMENTS

| | | | |
|---|---|---|---|
| 4,600,972 A | 7/1986 | MacIntyre | |
| 4,677,533 A | 6/1987 | McDermott et al. | |
| 4,732,442 A * | 3/1988 | Mori | 362/551 |
| 5,555,161 A * | 9/1996 | Roe et al. | 362/555 |
| 5,779,339 A * | 7/1998 | Konishi et al. | 362/26 |
| 6,031,958 A * | 2/2000 | McGaffigan | 362/555 |
| 6,322,226 B1 | 11/2001 | Dickson | |
| 6,612,729 B1 * | 9/2003 | Hoffman | 362/551 |
| 6,866,401 B2 | 3/2005 | Sommers et al. | |
| 6,883,943 B2 | 4/2005 | Elliott | |
| 7,108,386 B2 | 9/2006 | Jacobson et al. | |
| 7,123,811 B1 * | 10/2006 | Chen et al. | 362/335 |
| 7,172,314 B2 | 2/2007 | Currie et al. | |
| 7,207,695 B2 | 4/2007 | Coushaine et al. | |
| 7,334,932 B2 * | 2/2008 | Klettke | 362/612 |
| 7,344,290 B2 * | 3/2008 | Huang et al. | 362/555 |
| 2006/0002147 A1 * | 1/2006 | Hong et al. | 362/615 |
| 2007/0297177 A1 | 12/2007 | Wang et al. | |

* cited by examiner

*Primary Examiner* — Y My Quach Lee
(74) *Attorney, Agent, or Firm* — Lowe Hauptman Ham & Berner LLP

(57) ABSTRACT

A light emitting diode (LED) package includes a base, a body and several LED chips. The body having an end surface is disposed on the base. A peripheral recess is formed in the end surface. The LED chips are disposed on a bottom of the peripheral recess for providing sidelight of the LED package. The LED package is connectable to a light guide pipe including a column having an external circumferential surface and an internal reflection surface, and a plurality of prism structures disposed between or on at least one of the external circumferential surface and the internal reflection surface for scattering light received by the light guide pipe from the LED package.

25 Claims, 22 Drawing Sheets

LIGHT EMITTING DIODE PACKAGE AND LIGHT GUIDE PIPE AND BACKLIGHT MODULE AND LIQUID CRYSTAL DISPLAY DEVICE USING THE SAME

This application is a division of Ser. No. 11/457,595 filed Jul. 14, 2006 (now U.S. Pat. No. 7,553,045) which claims the benefit of Taiwan application Serial No. 94124414, filed Jul. 19, 2005, the entirety of the above-identified prior applications being incorporated herein by reference.

BACKGROUND

1. Technical Field

The invention relates in general to a backlight module and a liquid crystal display device, and more particularly, to a light emitting diode package, a light guide pipe, and a backlight module and a liquid crystal display device using the same.

2. Related Art

It has been known in the art that a liquid crystal display panel in a liquid crystal display device is not self-luminous, the liquid crystal display panel needs a backlight module to provide backlight in order to display images. A cold cathode fluorescent lamp or a hot cathode fluorescent lamp is generally used in a conventional backlight module as a light source.

However, cold and hot cathode fluorescent lamps include poisonous substances, such as mercury. It is not easy to recycle cold and hot cathode fluorescent lamps after long-time uses as the fluorescent lamps pollute the environment easily if not properly recycled. Furthermore, with the current upsurge in environmental protection consciousness and tendency to recycle all electronic products, backlight modules with fluorescent lamps are recognized as environment unfriendly and, therefore, applicability of the conventional fluorescent backlight modules and liquid crystal display devices using the same is lowered greatly.

There is a need for a backlight module and a liquid crystal display device using the same which do not suffer from the disadvantages of the conventional backlight modules and LCDs.

SUMMARY

In an aspect, a light emitting diode package comprises a base; a body disposed on the base, wherein the body has a first surface with a first recess formed therein; and a plurality of first light emitting diode chips disposed in the first recess for providing the light emitting diode package with sidelight.

In a further aspect, a light guide pipe comprises a column having an external circumferential surface and an internal reflection surface; and a plurality of prism structures disposed between or on at least one of the external circumferential surface and the internal reflection surface for scattering light received by the light guide pipe.

In another aspect, a backlight module comprises a frame, a light guide pipe and a light emitting diode package. The frame comprises a base board and a side board, wherein the base board and the side board define a containing space. The light guide pipe comprises a column disposed in the containing space and over the base board, wherein the column has an external circumferential surface and an internal reflection surface. The light guide pipe further comprises a plurality of prism structures disposed between or on at least one of the external circumferential surface and the internal reflection surface for scattering light received by the light guide pipe. The light emitting diode package comprises a base disposed on the base board, and a body disposed on the base board and inserted into the column after penetrating the external circumferential surface and the internal reflection surface. The body has a first end surface and a second, opposite end surface. The first end surface and the second end surface have a first peripheral recess and a second peripheral recess, respectively. The first peripheral recess corresponds to the second peripheral recess. A plurality of first light emitting diode chips are disposed on a bottom of the first peripheral recess for emitting sidelight toward one end of the light guide pipe. A plurality of second light emitting diode chips are disposed on the bottom of the second peripheral recess for emitting sidelight toward the other end of the light guide pipe.

In yet another aspect, a liquid crystal display comprises the above described backlight module, a first polarizer disposed over the backlight module; a liquid crystal display (LCD) panel disposed over the first polarizer; and a second polarizer disposed over the liquid crystal display panel.

Other objects, features, and advantages of the invention will become apparent from the following detailed description of the preferred but non-limiting embodiments. The following description is made with reference to the accompanying drawings.

DETAILED DESCRIPTION OF EMBODIMENTS

First Embodiment

Figure 1A:
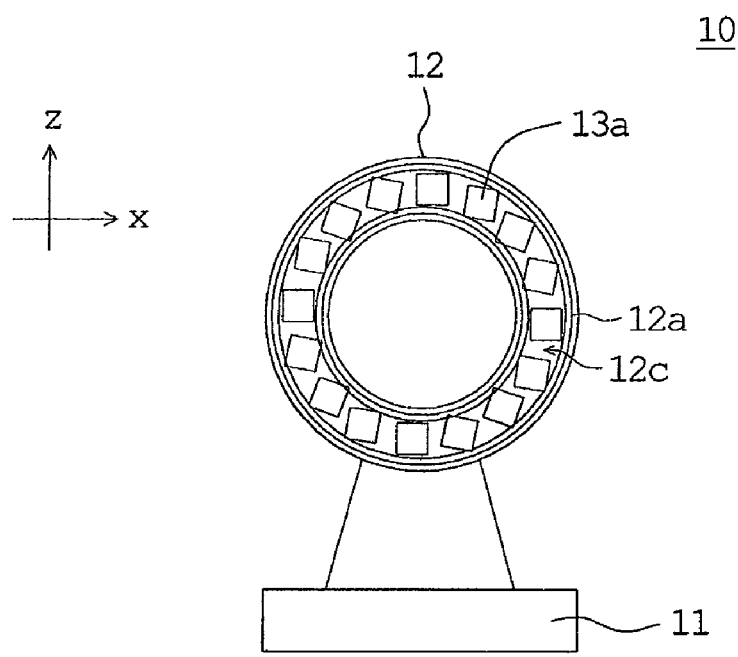
FIG. 1A is a front view of a light emitting diode package according to a first embodiment of the invention.
Figure 1B:
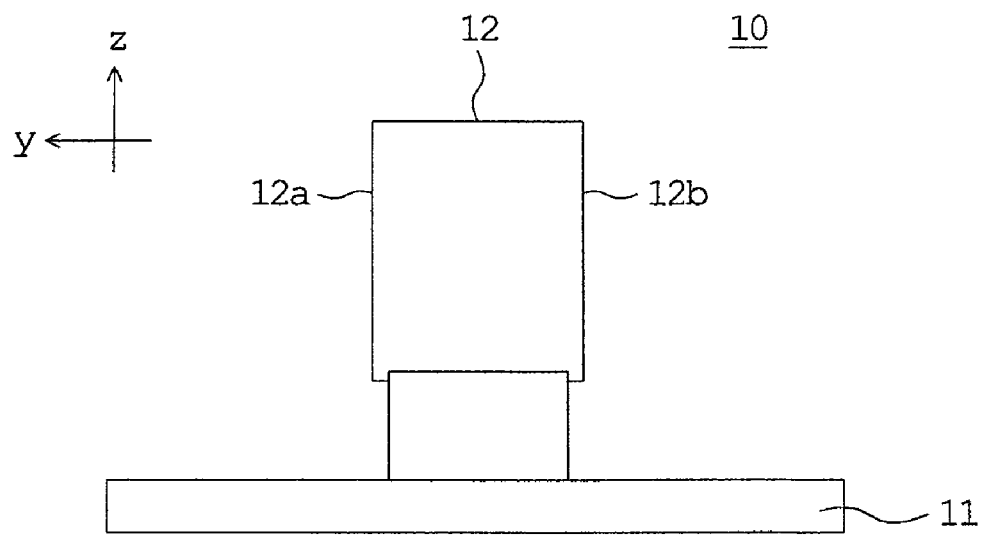
FIG. 1B is a side view of the light emitting diode package in FIG. 1A.
Figure 1C:
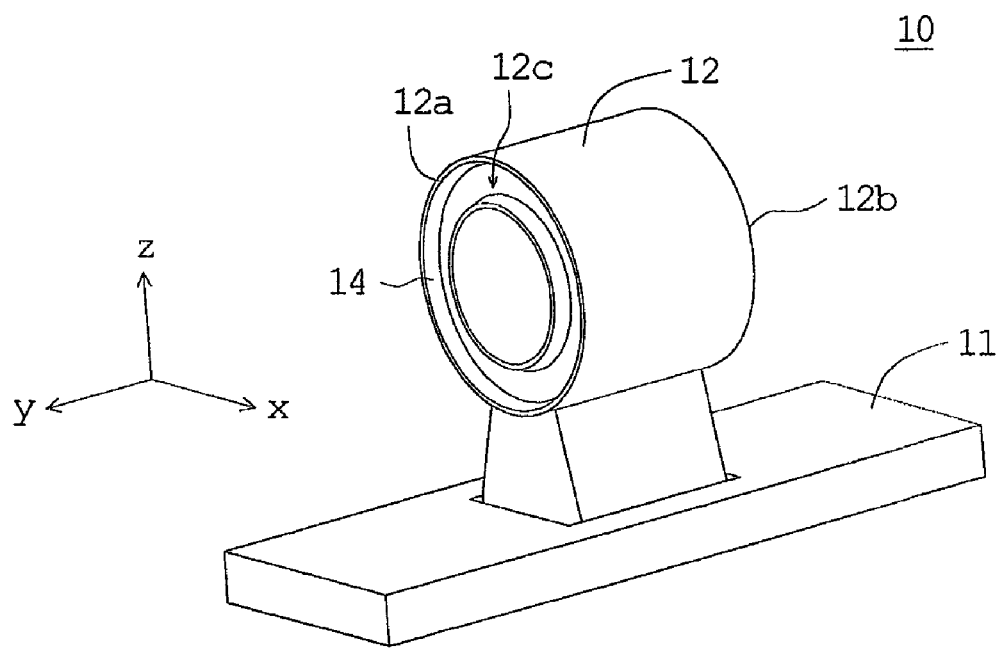
FIG. 1C is a three-dimensional view of a base and a body of the light emitting diode package in FIG. 1A.
Figure 1D:
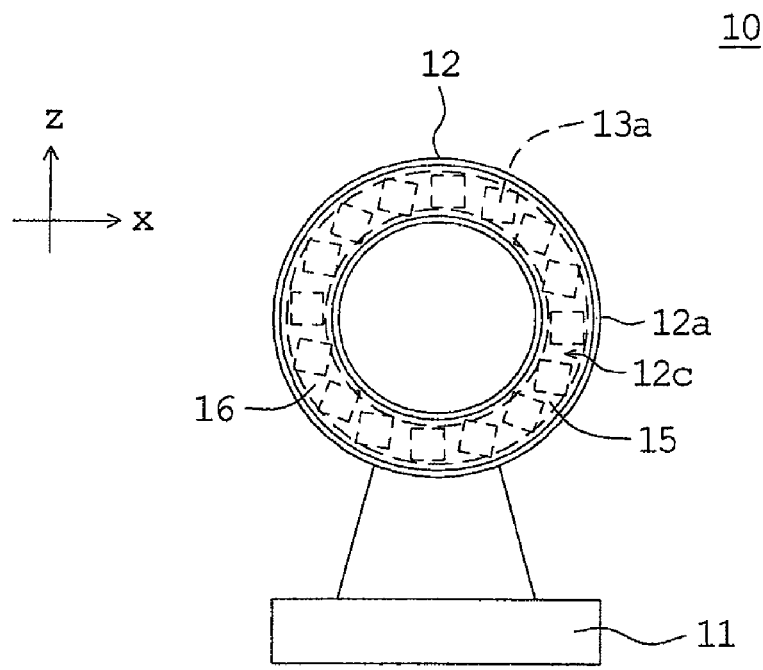
FIG. 1D is a front view of the light emitting diode package in FIG. 1A further including fluorescent powder and gel.
Figure 1E:
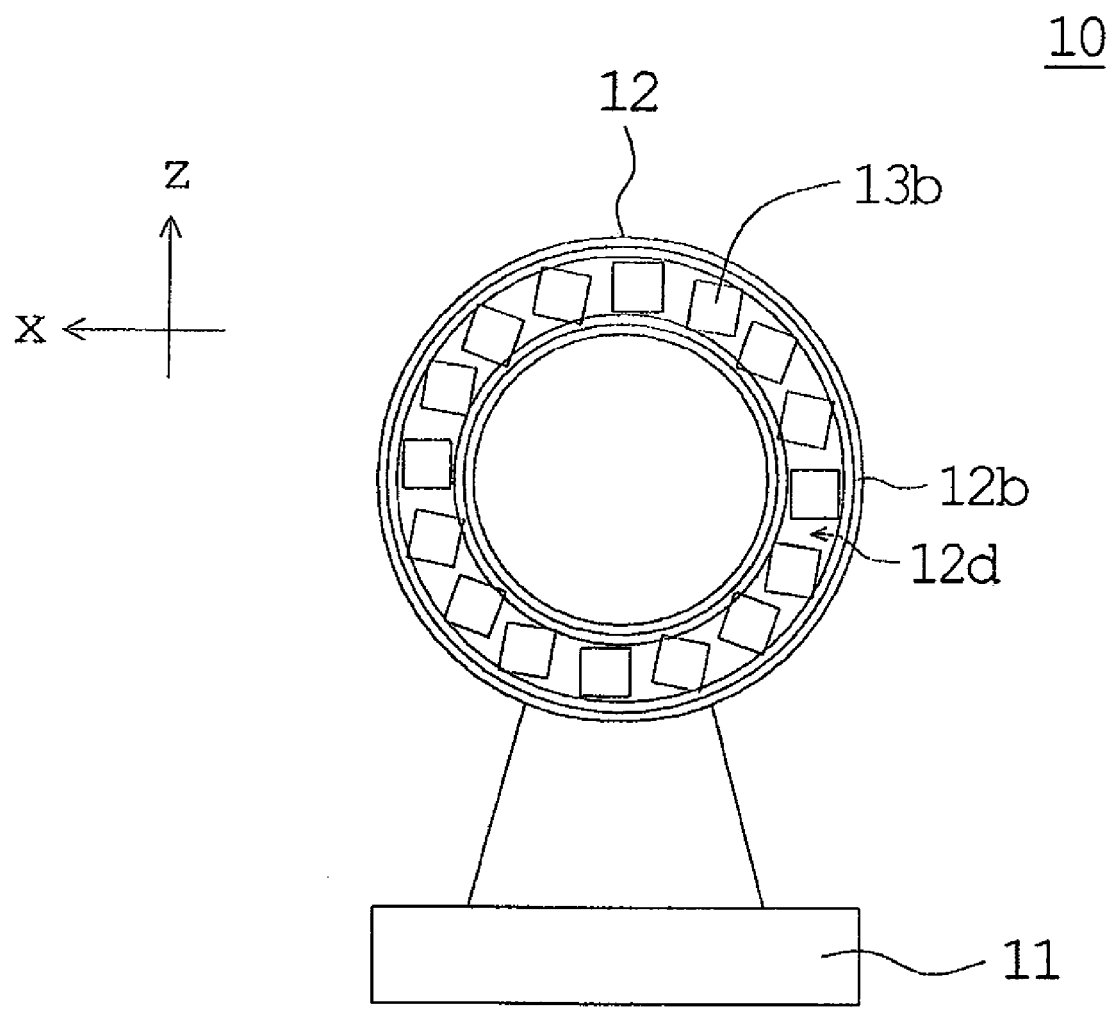
FIG. 1E is a back view of the light emitting diode package in FIG. 1A further including the fluorescent powder and the gel.

FIG. 1A is a front view of a light emitting diode package according to a first embodiment of the invention. FIG. 1B is a side view of the light emitting diode package in FIG. 1A. FIG. 1C is a three-dimensional view of a base and a body of the light emitting diode package in FIG. 1A. FIG. 1D is a front view of the light emitting diode package in FIG. 1A further including fluorescent powder and gel. FIG. 1E is a back view of the light emitting diode package in FIG. 1A further including the fluorescent powder and the gel.

As shown in FIGS. 1A~1B, a light emitting diode package 10 includes a base 11, a body 12 and several first light emitting diode chips 13a. The body 12 is disposed on the base 11 and has a first end surface 12a. A first peripheral recess 12c is formed on the first end surface 12a. The first light emitting diode chips 13a are disposed on a bottom of the first peripheral recess 12c for providing the light emitting diode package 10 with single-direction sidelight, such as +y direction sidelight. The light emitting diode package 10 at least emits circular single-direction sidelight. Other light patterns are not excluded.

For example, the body 12 is a cylinder or a polygonal column. A cylindrical body is illustrated as an example in the present embodiment. Furthermore, the first light emitting diode chips 13a include white light emitting diode chips or a combination of red (R), green (G) and blue (B) light emitting diode chips. The first light emitting diode chips 13a are preferably arranged linearly in one row and in an order of RGB. Or, the first light emitting diode chips 13a are preferably arranged in two rows and relatively staggered in an order of RGB. Moreover, the body 12 includes a thermal conductive material, a reflection material or a ceramic material. The base 11 includes a heat sink material for dissipating heat generated by the light emitting diode package 10. Also, the base 11 and the body 12 are preferably formed integrally. Besides, a circuit board is preferably disposed on or inside the base 11. The circuit board electrically connects an anode and a cathode of each first light emitting diode chip 13a to power terminals or a converter. For example, the circuit board is a flexible circuit board or a printed circuit board.

As shown in FIG. 1C, the light emitting package 10 further includes a reflection material 14. The reflection material 14 is disposed on a wall of the first peripheral recess 12c. The reflection material 14 preferably includes high reflective metal or metal alloy, such as aluminum or silver or alloys thereof. Furthermore, as shown in FIG. 1D, the light emitting diode package 10 further includes a fluorescent coating, i.e., powder 15, and gel 16. The fluorescent powder 15 is coated on the first light emitting diode chips 13a. The gel 16 is filled in the first peripheral recess 12c and covers the first light emitting diode chips 13a and the fluorescent powder 16. For example, the first light emitting diode chips 13a include blue light emitting diode chips, and the fluorescent powder 15 includes yellow fluorescent powder. As a result, white light is generated when blue light emitted by the blue light emitting diode chips interacts with the yellow fluorescent powder. Therefore, the light emitting diode package 10 at least emits single-direction lateral white light.

Various combinations of the first light emitting diode chips 13a and the powder 15 are available. For example, blue light emitting diode chips can be combined with green fluorescent powder and red fluorescent powder. Alternatively, purple light emitting diode chips can be combined with green fluorescent powder and red fluorescent powder. Or, purple light emitting diode chips can be combined with red fluorescent powder, green fluorescent powder and blue fluorescent powder. Other combinations are not excluded depending on the desired color of the light emitting diode package 10. Furthermore, the gel 16 is preferably epoxy, poly(methyl methacrylate) (PMMA), polycarbonate (PC) or white gel, which does not affect light emission of the light emitting diode package 10.

As shown in FIG. 1E, the body 12 further has a second end surface 12b opposite to the first end surface 12a. A second peripheral recess 12d corresponding to the first peripheral recess 12c is formed on the second end surface 12b. The light emitting diode package 10 further includes several second light emitting diode chips 13b. The second light emitting diode chips 13b are disposed in the second peripheral recess 12d. The second light emitting diode chips 13b provide the light emitting diode package 10 with single-direction sidelight, such as −y direction sidelight. Therefore, the light emitting diode package 10 emits two-direction sidelight. Another reflection material is preferably formed on a wall of the second peripheral recess 12d. Fluorescent powder is preferably coated on the second light emitting diode chips 13b. The second light emitting diode chips 13a and the fluorescent powder coated thereon are preferably covered by gel filled in the second peripheral recess 12d. Moreover, the second light emitting diode chips 13b include white light emitting diode chips or a combination of red (R), green (G) and blue (B) light emitting diode chips. Also, the second light emitting diode chips 13b are preferably arranged linearly in one row and in an order of RGB. Or, the second light emitting diode chips 13b are arranged in two rows and relatively staggered in an order of RGB. Other arrangements are not excluded depending on the desired color of the light emitting diode package 10. Moreover, an anode and a cathode of each second light emitting diode chip 13b are preferably electrically connected to power terminals or a converter through a circuit board on or inside the base 11.

Second Embodiment

Figure 2A:
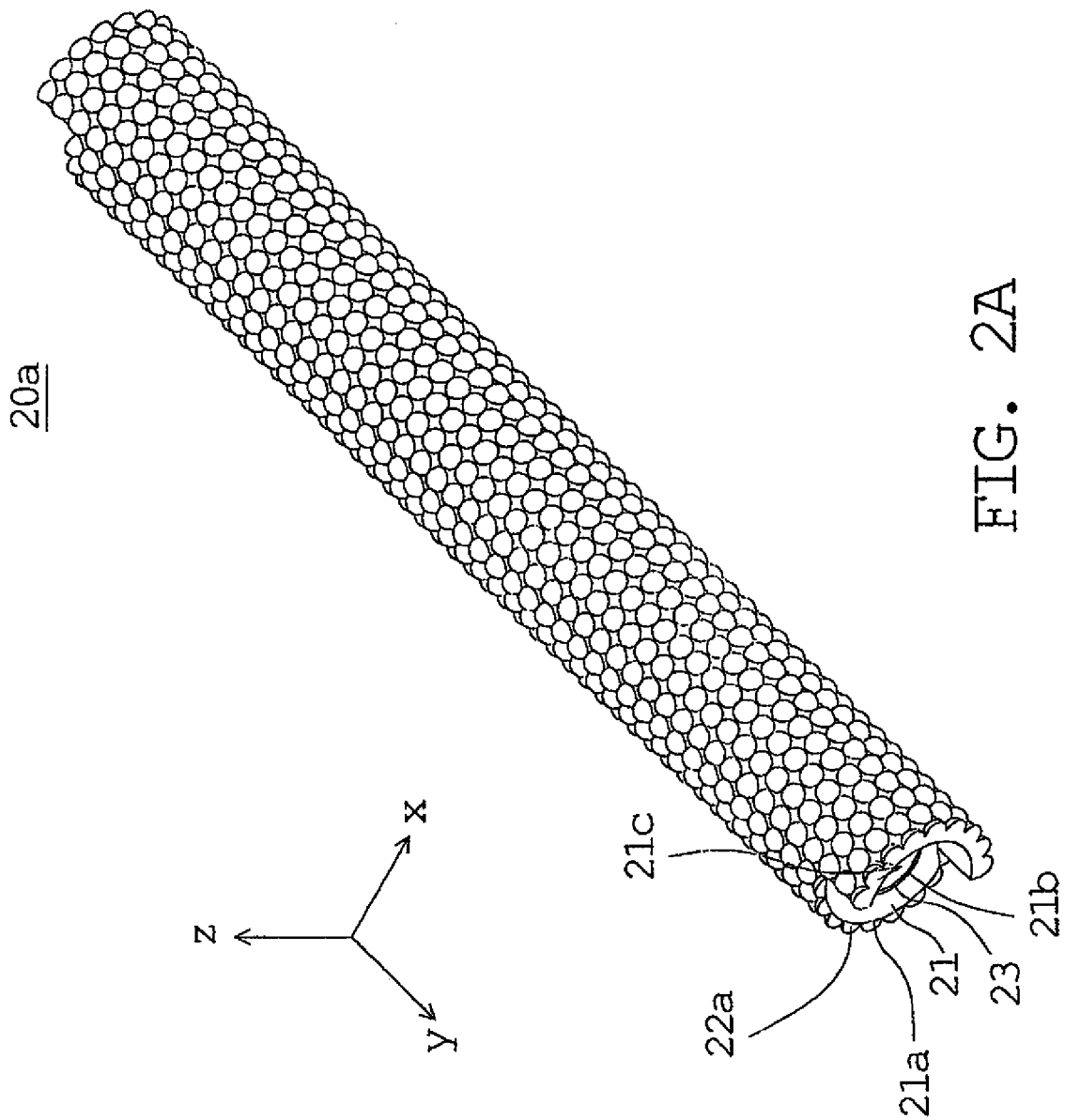
FIG. 2A is a three-dimensional view of a light guide pipe according to a second embodiment of the invention.
Figure 2B:
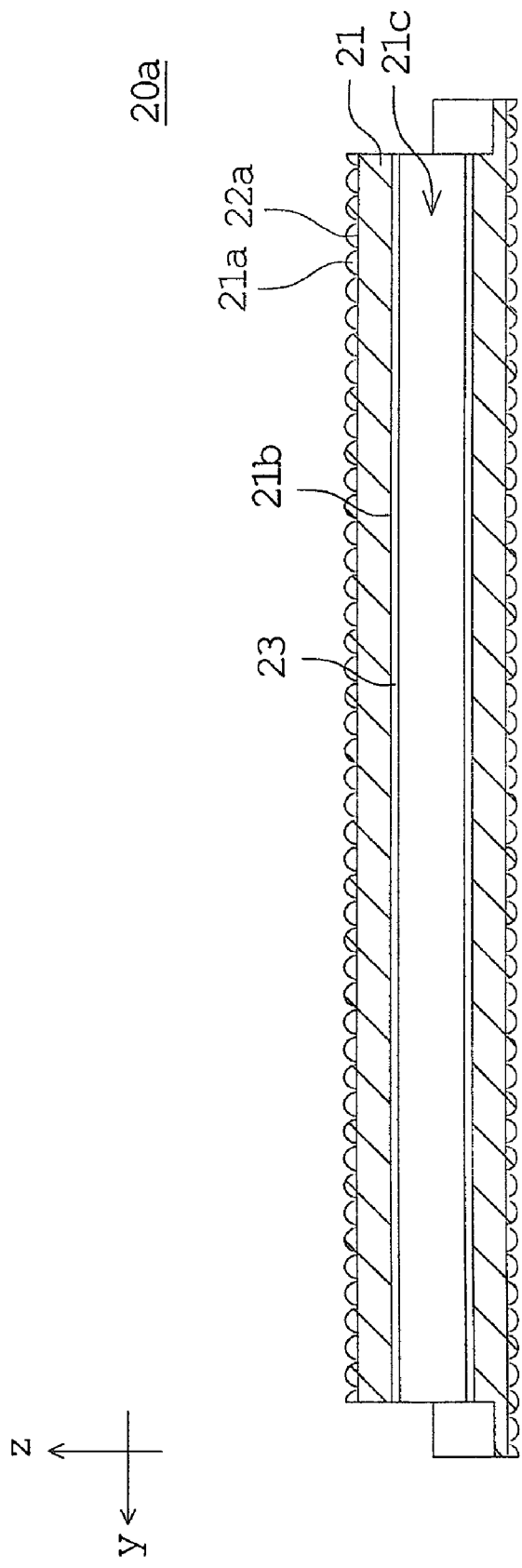
FIG. 2B is a cross-sectional view of the light guide pipe in FIG. 2A viewed along +x direction with yz plane as a cross-sectional plane.
Figure 2C:
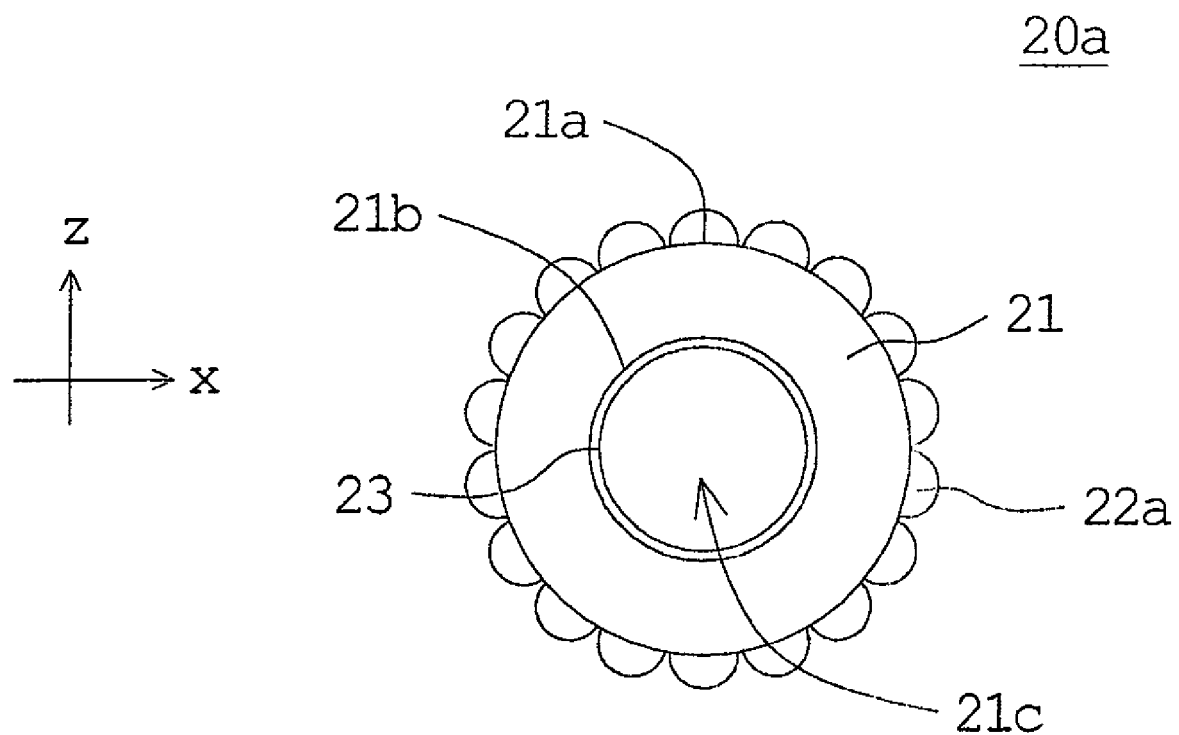
FIG. 2C is a magnified cross-sectional view of the light guide pipe in FIG. 2A viewed along +y direction with xz plane as a cross-sectional plane.

FIG. 2A is a three-dimensional view of a light guide pipe according to a second embodiment of the invention. FIG. 2B is a cross-sectional view of the light guide pipe in FIG. 2A viewed along +x direction with yz plane as a cross-sectional plane. FIG. 2C is a magnified cross-sectional view of the light guide pipe in FIG. 2A viewed along +y direction with xz plane as a cross-sectional plane. As shown in FIGS. 2A-2C, the light guide pipe 20a is for receiving light emitted by a light source from one end of the light guide pipe 20a and for scattering, by refraction, the received light. The light guide pipe 20a includes a column 21 and several prism structures 22a. The column 21 has an external circumferential surface 21a and an internal reflection surface 21b. The internal reflection 21b is arranged for reflecting light received by the light guide pipe 20a. The prism structures 22a can be disposed between the external circumferential surface 21a and the internal reflection surface 21b, or, as can be seen in FIG. 2C, on the external circumferential surface 21a, for scattering light received by the light guide pipe 20a. As a result, the guide pipe 20a scatters light through the external circumferential surface 21a. For example, the column 21 and the prism structures 22a are formed integrally. Also, the column 21 is preferably a cylinder or a polygonal column. A cylindrical column is illustrated in the present embodiment as an example.

In the present embodiment, the prism structures 22a are disposed on the external circumferential surface 21a. The prism structures 22a include a pattern of dots. The pattern dots are preferably protrusions. For example, a light source is positioned at one end of the light guide pipe 20a. Although the pattern dots are of the same size in the present embodiment, the prism structures 22a are not limited thereto. As seen in y direction, the pattern dots are preferably smaller and less densely distributed when closer to the light source. Therefore, incident light reaches uniformly to an effective application range of the light guide pipe 20a. The pattern dots farther from the light source are preferably bigger and more densely distributed, so that a scattering area of the incident light is larger. Therefore, the refraction effect of the light guide pipe 20a on the incident light is optimized or enhanced. In the present embodiment, although the pattern dots are shown in FIG. 2C to be distributed uniformly on the circumferential surface 21a, the arrangement of the pattern dots on the circumferential surface 21a can be adjusted according to the practical situation. Therefore, the intensity of scattered light in a specific angle range is controllable. Furthermore, the pattern dots are preferably circular or polygonal. Circular prism structures 22a or pattern dots are illustrated as an example in the present embodiment. Also, the light guide pipe 20a in the present embodiment is preferably made of optical grade PMMA or optical grade PC. The light guide pipe 20a is preferably solid or hollow.

A manufacturing method of the internal reflection surface 21b will be briefly explained below. However, the invention is not limited thereto. For example, the column 21 further includes a through hole 21c, and the light guide pipe 20a further includes a reflection material 23. The reflection material 23 is formed, e.g., by coating, on an inner wall of the through hole 21c, so that the internal reflection surface 21a is formed in the column 21.

Figure 2D:
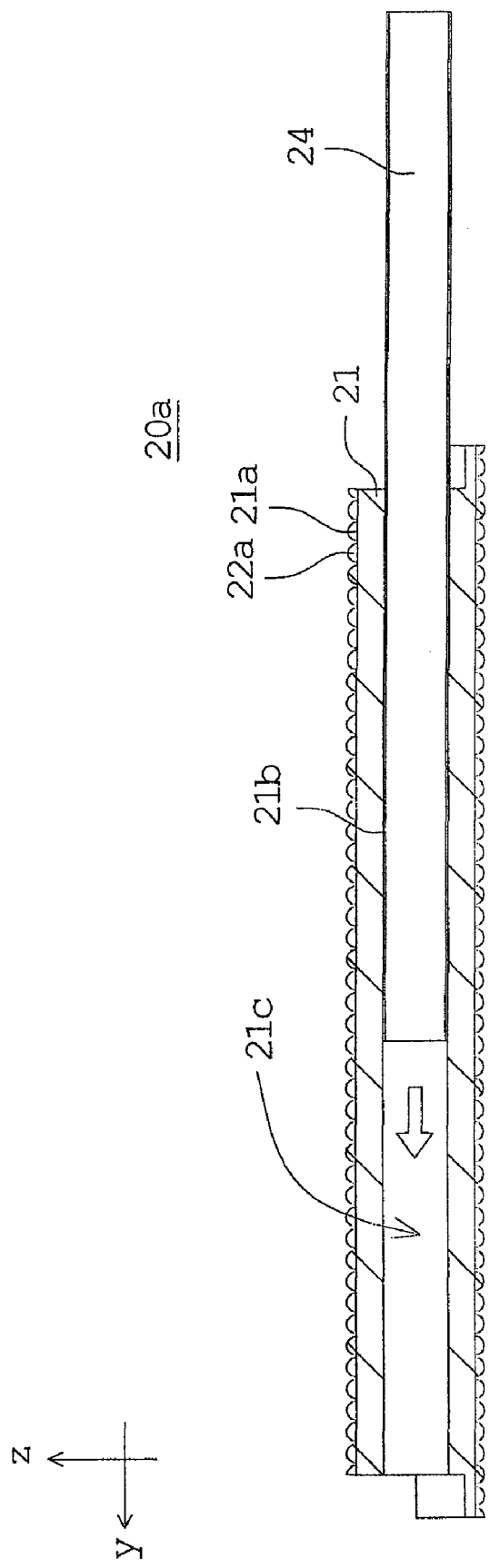
FIG. 2D illustrates an internal reflection surface in FIG. 2B formed by a reflection pipe in the column.

Refer to FIG. 2D, the internal reflection surface 21b in FIG. 2B formed by a reflection pipe in the column 21 is illustrated. For example, the light guide pipe 20a further includes a reflection pipe 24. The reflection pipe 24 is inserted into the through hole 21c along an axial (arrow) direction, so that the internal reflection surface 21b is formed by the outer reflective surface of the reflection pipe 24 in the column 21. The reflection pipe 24 is preferably inserted in a mold of the column 21 first. Then, the column 21 and the reflection pipe 24 are formed integrally by twice injection molding. Or, the reflection pipe 24 is preferably formed by rolling a pre-cut reflection sheet. After the column 21 is formed, e.g., by injection molding, the reflection pipe 24 and the column 21 are formed integrally and shaped.

When the light guide pipe 20a is hollow, one column, i.e., 24, is preferably inserted into another column, i.e., 21, to form the light guide pipe 20a by twice injection molding in a mold. Or, column 21 can be formed from a sheet by pressing. The prism structures 22a are formed on a surface of the sheet. Then, the sheet is rolled with the prism structures 22a facing outward to form the light guide pipe 20a. Furthermore, the prism structures 22a with the pattern dots are formed on the external circumferential surface 21a of the column 21 by injection molding, printing, pressing or ink rolling.

In the light guide pipe 20a of the present embodiment, the prism structures 22a are formed on the external circumferential surface 21a. As a result, the light guide pipe 20a can be used with a light source that emits light in a pattern corresponding to an annular area between the external circumferential surface 21a and the internal reflection surface 21b. For example, when the area between the external circumferential surface 21a and the internal reflection surface 21b of the light guide pipe 20a is coupled to the first peripheral recess 12c of the light emitting diode package 10 in the first embodiment, circular sidelight emitted by the light emitting diode package 10 enters the light guide pipe 20a through the area between the external circumferential surface 21a and the internal reflection surface 21b. Therefore, by the effects of the prism structures 22a, the internal reflection surface 21b and the light guiding material of the column 21, the light guide pipe 20a scatters the received light to the surrounding environment through the external circumferential surface 21a. Therefore, the light guide pipe 20a of the present embodiment converts circular light emitted by the light emitting diode package 10 of the first embodiment or by another light source to lamp-like light.

Third Embodiment

Figure 3:
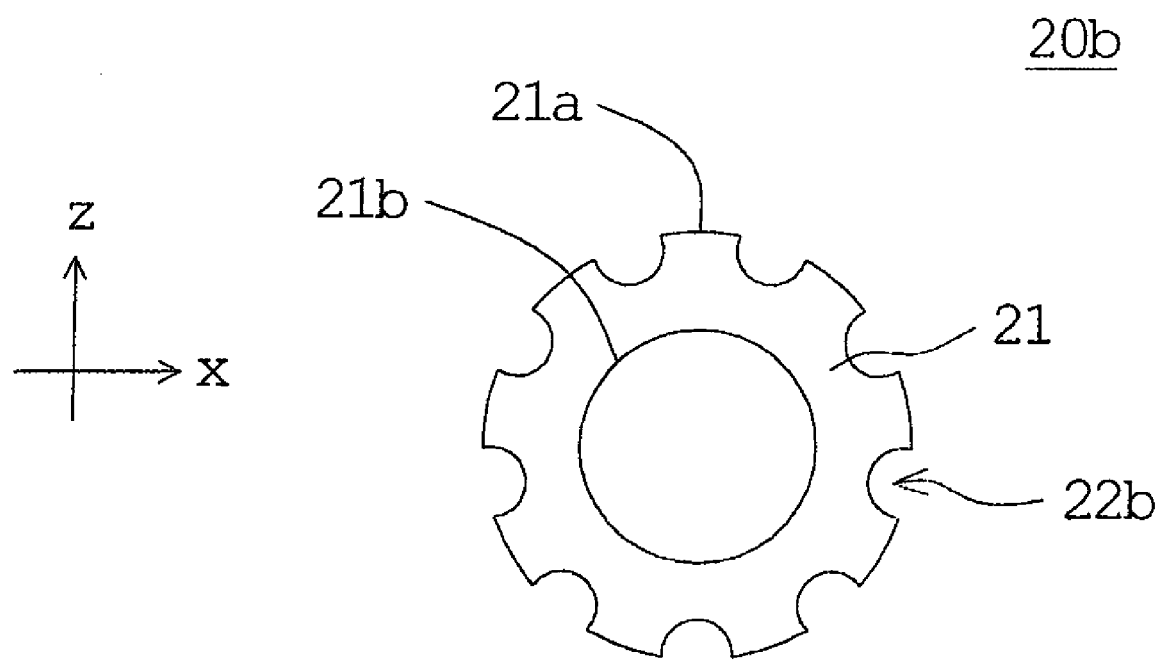
FIG. 3 is a cross-sectional view of a light guide pipe according to a third embodiment of the invention.

In FIG. 3, a cross-sectional view of a light guide pipe according to a third embodiment of the invention is illustrated. The difference between a light guide pipe 20b of the present embodiment and the light guide pipe 20a of the second embodiment lies in prism structures 22b. The same components use the same reference numbers and are not described again.

As shown in FIG. 3, although the prism structures 22b of the present embodiment and the prism structures 22a of the second embodiment all includes pattern dots, the pattern dots of the present embodiment are concave dots or cavities, rather than protrusions. A manufacturing method of the light guide pipe 20b in the present embodiment is substantially the same as that of the light guide pipe 20a in the second embodiment and is not described again. Besides, the distribution and manufacturing method of the prism structures 22b in the present embodiment are substantially the same as those in the second embodiment and are not described again. Furthermore, the pattern dots of the prism structures 22b are preferably circular or polygonal. Circular prism structures 22b are illustrated in the present embodiment as an example. Also, the light guide pipe 20b of the present embodiment is preferably made of optical grade PMMA or optical grade PC. Moreover, the light guide pipe 20b is preferably solid or hollow. The prism structures 22b and the column 21 are preferably formed integrally.

Fourth Embodiment

Figure 4A:
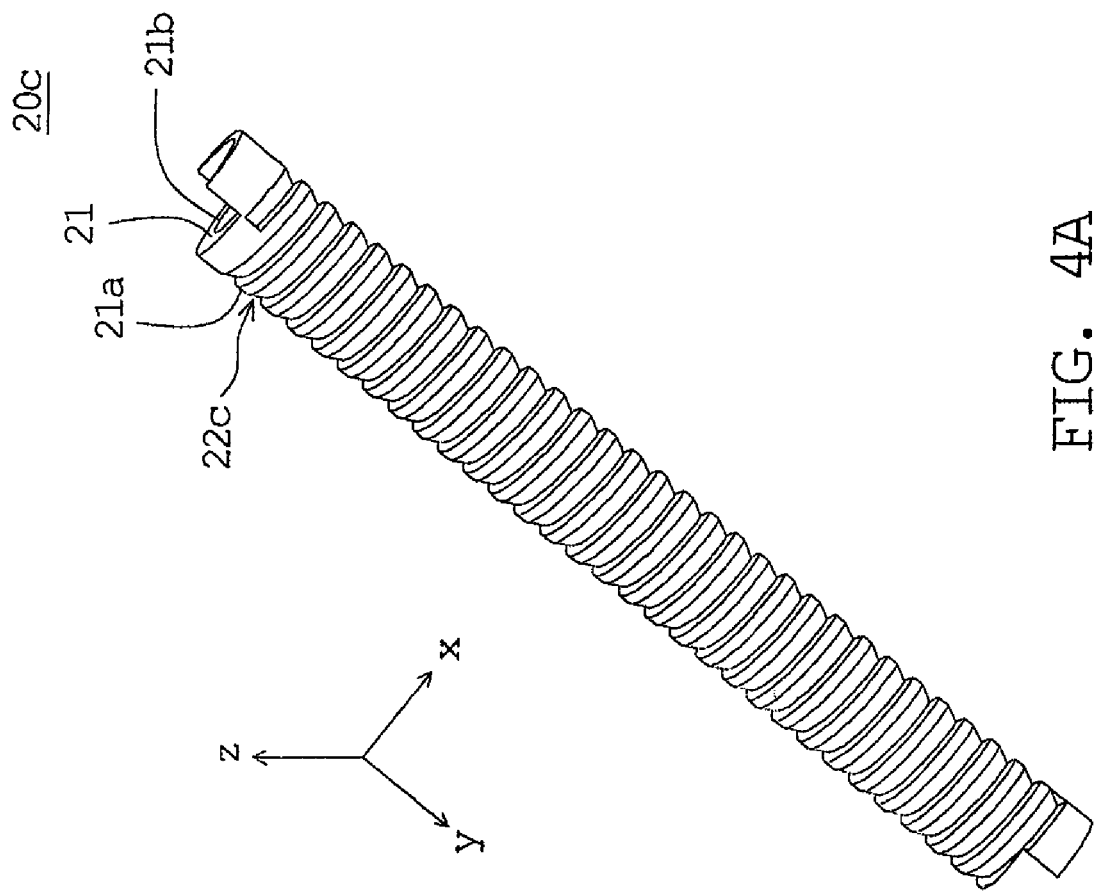
FIG. 4A is a three-dimensional view of a light guide pipe according to a fourth embodiment of the invention.

FIG. 4A is a three-dimensional view of a light guide pipe 20c according to a fourth embodiment of the invention. FIG.

4B is a cross-sectional view of the light guide pipe in FIG. 4A viewed along +x direction with yz plane as a cross-sectional plane. The difference among the light guide pipe 20c of the present embodiment, the light guide pipe 20a of the second embodiment and the light guide pipe 20b of the third embodiment lies in prism structures 22c. The same components use the same reference numbers and are not described again.

Figure 4B:
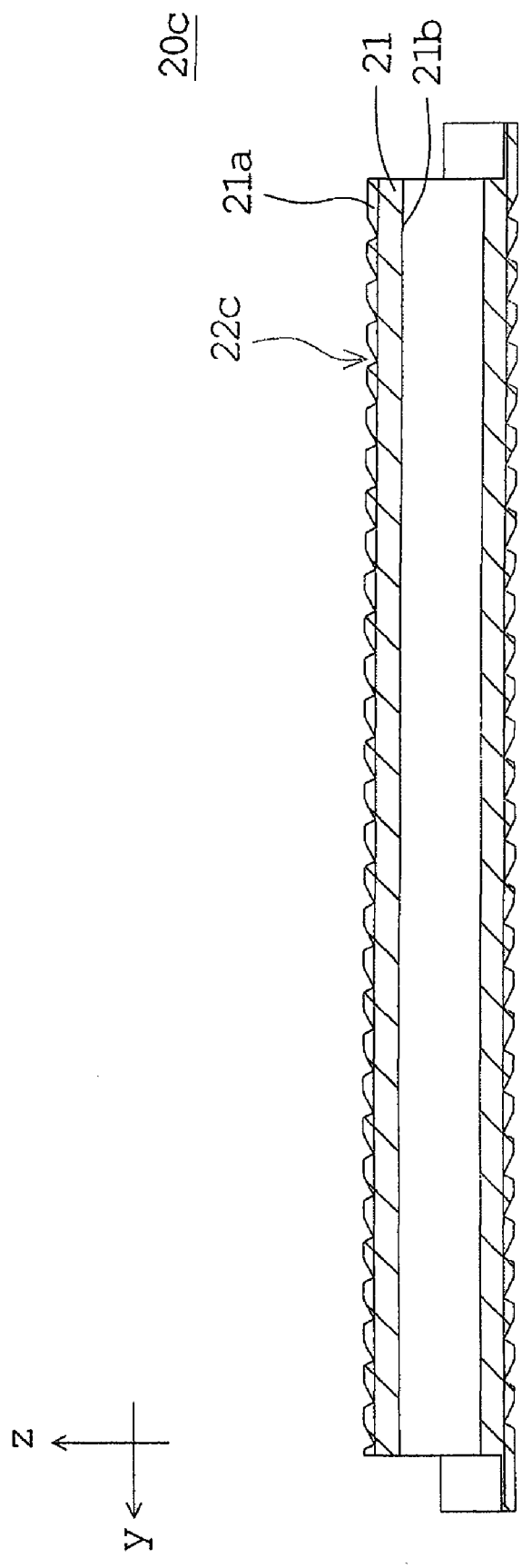
FIG. 4B is a cross-sectional view of the light guide pipe in FIG. 4A viewed along +x direction with yz plane as a cross-sectional plane.

As shown in FIGS. 4A~4B, the prism structures 22c of the present embodiment are preferably screw thread prisms. The screw thread prisms 22c include concave screw thread prisms which are formed as continuous or discontinuous helical recesses in the external circumferential surface 21a. Furthermore, each screw thread prism can be continuous or discontinuous. Continuous screw thread prisms are illustrated as an example in the present embodiment. When a light source is positioned at one end of the light guide pipe 20c, the light guide pipe 20c is arranged for receiving light emitted by the light source from that one end of the light guide pipe 20c and for scattering the received light. Although the screw thread prisms with a constant pitch are illustrated in the present embodiment, other arrangements of the prism structures 22c having the configuration of screw threads on the external circumferential surface 21a are not excluded. For example, as seen in y direction, the pitch of the prism structures 22c having the configuration of screw threads is preferably smaller when prism structures 22c are closer to the light source. Also, the prism structures 22c having the configuration of screw threads are less densely distributed when closer to the light source. As a result, incident light reaches to an effective range of the light guide pipe 20c. The pitch of the prism structures 22c is preferably larger when the prism structures 22c are farther from the light source. Also, the prism structures 22c are more densely distributed when the prism structures 22c are farther from the light source. Therefore, a scattering area of the incident light is larger to enhance or optimize the refraction effect of the light guide pipe 20c on the incident light. In the present embodiment, although the prism structures 22c having the configuration of screw thread are shown to be continuous on the external circumferential surface 21a, the prism structures 22c having the configuration of screw threads can be adjusted to be discontinuous according to the practical situation. Therefore, light intensity in a specific angle range is controllable.

Besides, the light guide pipe 20c of the present embodiment is preferably made of optical scale PMMA or optical scale PC. Furthermore, the light guide pipe 20c is preferably solid or hollow. The prism structures 22c and the column 21 are preferably formed integrally. The manufacturing method of the light guide pipe 20c in the present embodiment is substantially the same as that of the light guide pipe 20a in the second embodiment and is not described again.

Fifth Embodiment

Figure 5:
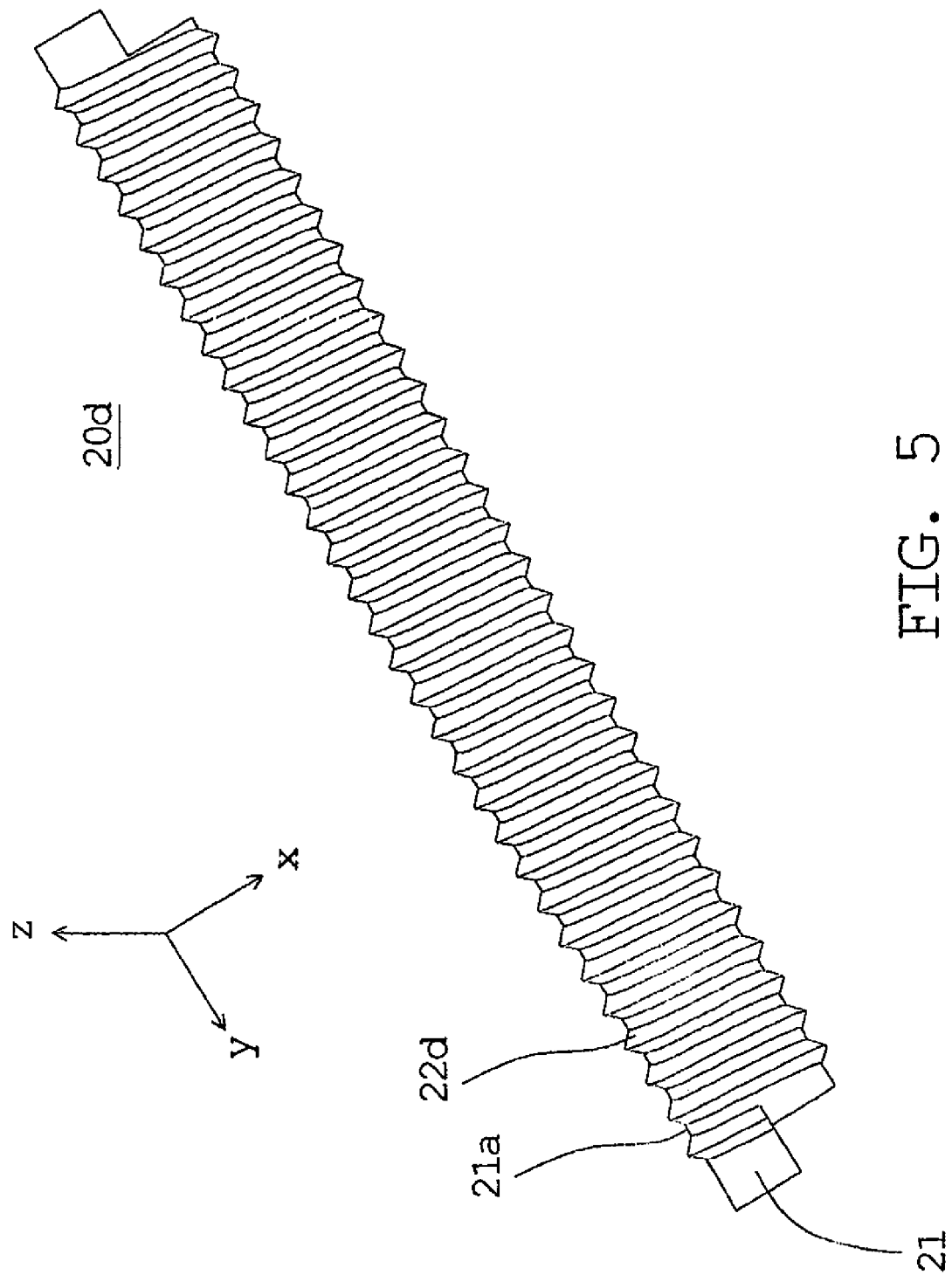
FIG. 5 is a cross-sectional view of a light guide pipe according to a fifth embodiment of the invention.

In FIG. 5, a cross-sectional view of a light guide pipe 20d according to a fifth embodiment of the invention is shown. The difference between the light guide pipe 20d of the present embodiment and the light guide pipe 20c of the fourth embodiment lies in prism structures 22d. The same components use the same reference numbers and are not described again.

As shown in FIG. 5, although the prism structures 22d of the present embodiment and the prism structures 22c of the fourth embodiment are all screw thread prisms, the screw thread prisms 22d of the present embodiment are protruding screw threads. In other words, the prism structures 22d are protruding screw thread prisms which are formed as continuous or discontinuous helical protrusions on the external circumferential surface 21a. The manufacturing method of the light guide pipe 20d of the present embodiment is substantially the same as that of the light guide pipe 20c of the fourth embodiment and is not described again. Also, the distribution and manufacturing method of the prism structures 22d are substantially the same as those of the prism structures 22c of the fourth embodiment and are not described again. Furthermore, each prism structure 22d having the configuration of screw threads is preferably continuous or discontinuously. The light guide pipe 20d in the present embodiment is preferably made of optical grade PMMA or optical grade PC. Also, the light guide pipe 20d is preferably solid or hollow, and the prism structures 22d and the column 21 are preferably formed integrally.

Sixth Embodiment

Figure 6:
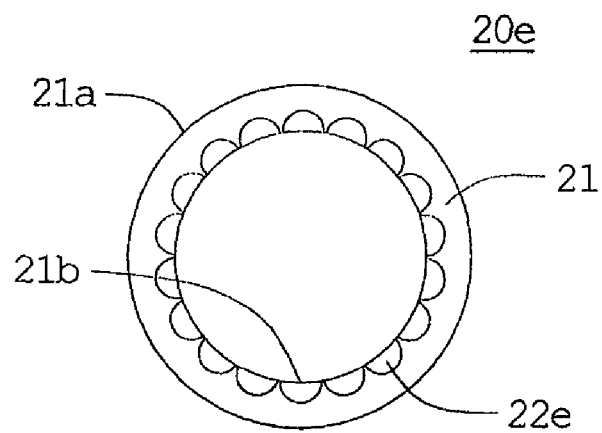
FIG. 6 is a cross-sectional view of a light guide pipe according to a sixth embodiment of the invention.

In FIG. 6, a cross-sectional view of a light guide pipe according to a sixth embodiment of the invention is illustrated. The difference between the light guide pipe 20e of the present embodiment and the light guide pipe 20a of the second embodiment is that prism structures 22e are adjacent to the internal reflection surface 21b. The same components use the same reference numbers and are not described again.

As shown in FIG. 6, the prism structures 22e of the present embodiments include pattern dots, and the pattern dots are concave dots or cavities, rather than protrusions. In other words, the prism structures 22e are concave dots which are adjacent to the internal reflection surface 21b, unlike the concave dots 22b of the third embodiment which are adjacent to the external circumferential surface 21a. The manufacturing method of the light guide pipe 20e is illustrated briefly as follows. First, a sheet is formed by pressing. Prism structures or cavities 22e are formed on a surface of the sheet. Next, the sheet is rolled with the prism structures 22e facing inward to form the light guide pipe 20e. In an alternative method, a reflection structure is formed by injection molding. The prism structures 22e are formed on the external circumferential surface of the reflection structure. Then, the reflection structure is placed in a mold to perform twice clamp-type injection molding to form the light guide pipe 20e. Furthermore, the distribution of the prism structures 22e of the present embodiment is substantially the same as that of the prism structures 22a of the second embodiment and is not described again. Moreover, the pattern dots of the prism structures 22e are preferably circular or polygonal. Circular prism structures 22e are illustrated in the present embodiment as an example. The light guide pipe 20e is preferably made of optical grade PMMA or optical grade PC. Furthermore, the light guide pipe 20e is preferably solid or hollow.

Seventh Embodiment

Figure 7:
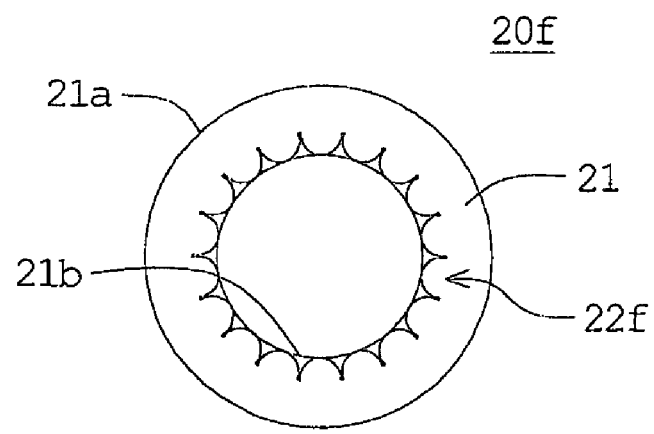
FIG. 7 is a cross-sectional view of the light guide pipe according to a seventh embodiment of the invention.

In FIG. 7, a cross-sectional view of the light guide pipe according to a seventh embodiment of the invention is illustrated. The difference between a light guide pipe 20f of the present embodiment and the light guide pipe 20e of the sixth embodiment lies in prism structures 22f. The same components use the same reference numbers and are not described again.

As shown in FIG. 7, the prism structures 22f of the present embodiment and the prism structures 22e of the sixth embodiment both include pattern dots. However, the pattern dots of the present embodiment are convex dots or protrusions which are adjacent to the internal reflection surface 21b, unlike the convex dots or protrusions 22a of the second embodiment which are adjacent to the external circumferential surface 21a. In other words, the prism structures 22f include convex dots. The manufacturing method of the light guide pipe 20f is substantially the same as that of the light guide pipe 20e of the sixth embodiment and is not described again. Furthermore, the distribution of the prism structures 22f is substantially the same as that of the prism structures 22b of the third embodiment and is not described again. Furthermore, the pattern dots of the prism structures 22f are preferably circular or polygonal. Circular prism structures are illustrated as an example in the present embodiment. Moreover, the light guide pipe 20f of the present embodiment is preferably made of optical grade PMMA or optical grade PC. The light guide pipe 20f is preferably solid or hollow.

Eighth Embodiment

Figure 8:
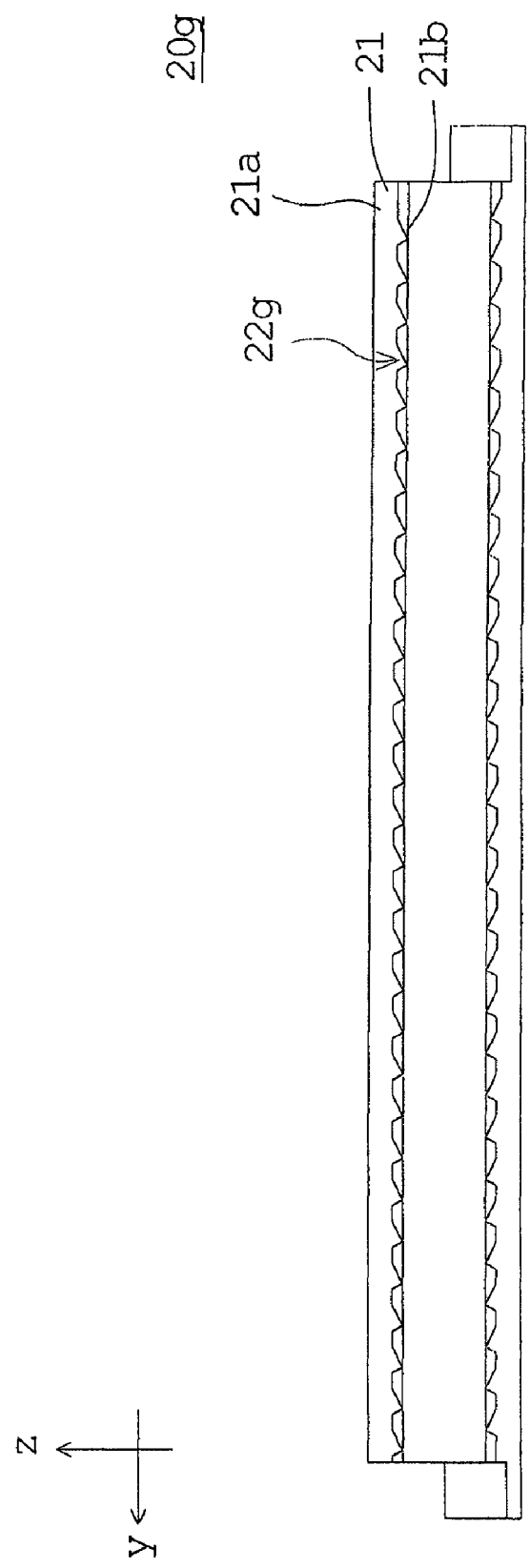
FIG. 8 is a cross-sectional view of a light guide pipe according to an eighth embodiment of the invention.

In FIG. 8, a cross-sectional view of a light guide pipe according to an eighth embodiment of the invention is illustrated. The difference between the light guide pipe 20g of the present embodiment and the light guide pipe 20c of the fourth embodiment is that prism structures 22g are adjacent to the internal reflection surface 21b. The same components use the same reference numbers and are not described again.

As shown in FIG. 8, the prism structures 22g include screw thread prisms, and the screw thread prisms are female screw thread prisms, unlike the screw thread prisms 22c of the fourth embodiment which are male screw threads. In other words, the prism structures 22g include female screw thread prisms adjacent to the internal reflection surface 21b. The female screw thread prisms 22g can be continuous or discontinuous helical recesses formed in the internal surface 21b like screw thread prisms 22c of the fourth embodiment, or continuous or discontinuous helical protrusions formed on the internal surface 21b like screw thread prisms 22d of the fifth embodiment, The manufacturing method of the light guide pipe 20g is substantially the same as that of the light guide pipe 20e of the sixth embodiment and is not described again. Furthermore, the distribution of the prism structures 22g is substantially the same as that of the prism structures 22c of the fourth embodiment and is not described again. Moreover, the light guide pipe 20g of the present embodiment is preferably made of optical grade PMMA or optical grade PC. Also, the light guide pipe 20g is preferably solid or hollow.

According to the present embodiment, the prism structures 22g with female screw thread prisms are preferably adjacent to the internal reflection surface 21b of the column 21 to form a different type light guide pipe. The manufacturing method of the light guide pipe 20g is substantially the same as that of the light guide pipe 20e of the sixth embodiment and is not describes again. The light guide pipe 20g is preferably made of optical grade PMMA or optical grade PC. Also, the light guide pipe 20g is preferably solid or hollow. The distribution of the prism structures 22g with female screw thread prisms adjacent to the internal reflection surface 21b is substantially the same as that of the prism structures 22d of the fifth embodiment and is not described again.

A light source module assembled by the light emitting diode package of the first embodiment and any light guide pipe of the second to eighth embodiments can be used as a daylight lamp, in a specific indoor lighting combination, an outdoor advertisement board, a flashlight combination or a backlight module of a liquid crystal display device.

Ninth Embodiment

Figure 9A:
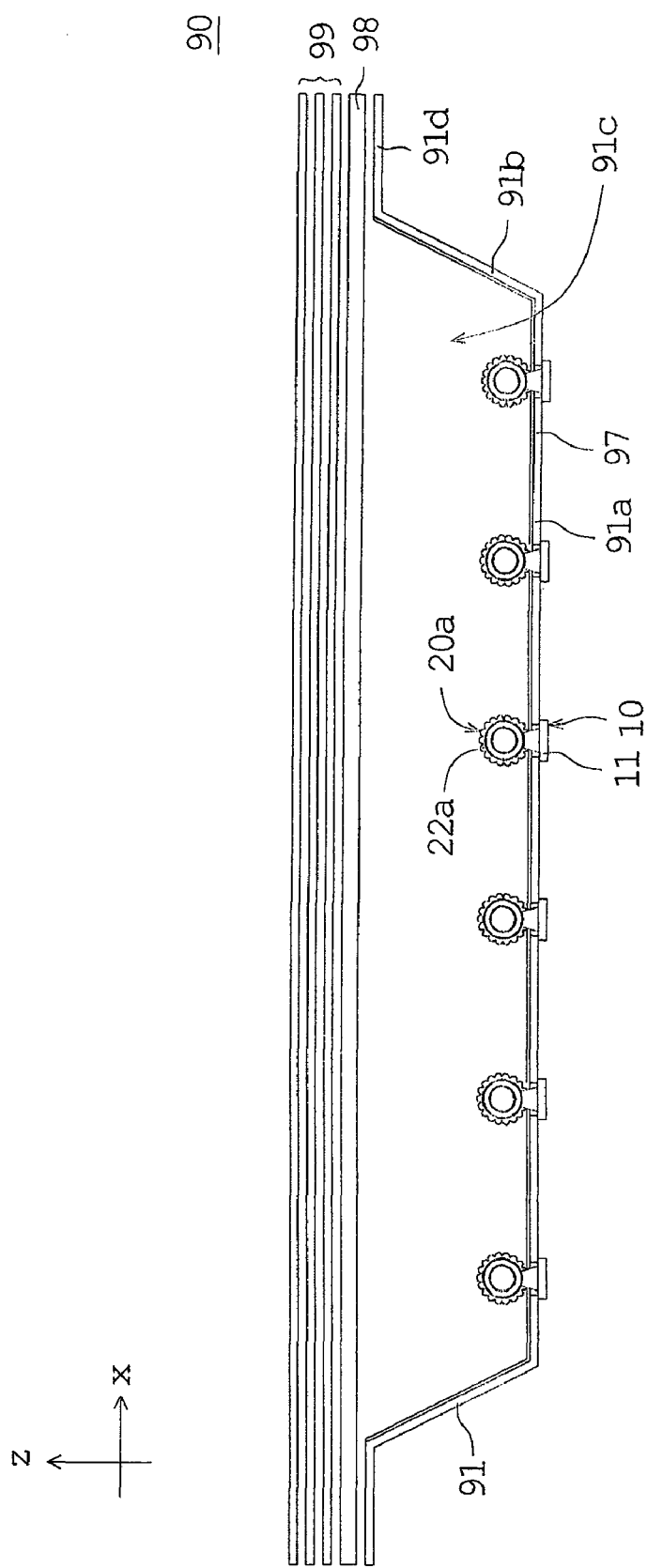
FIG. 9A illustrates a front view of a backlight module according to a ninth embodiment of the invention.
Figure 9B:
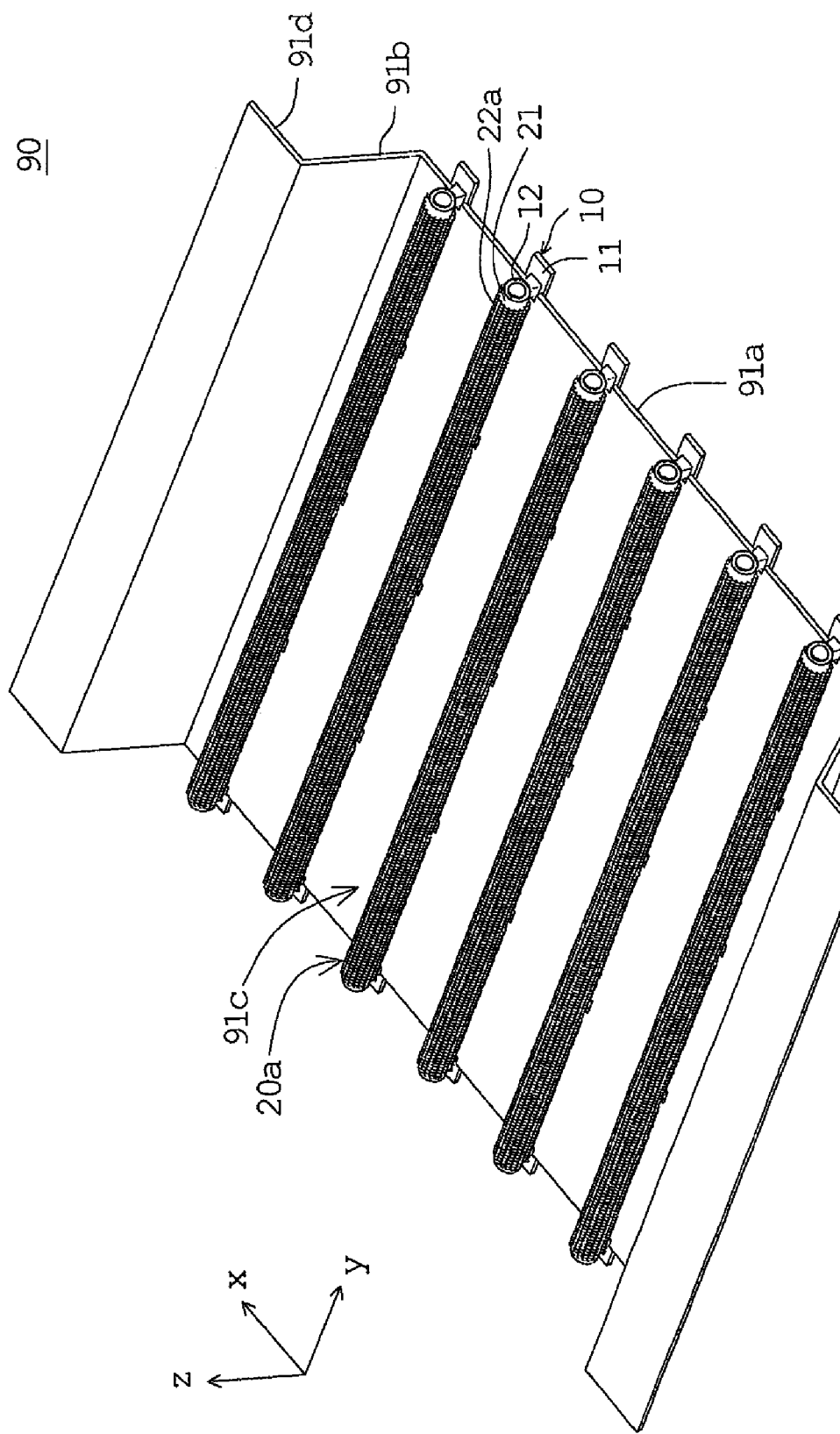
FIG. 9B is a three-dimensional view of the backlight module of FIG. 9A which is a combination of a frame, a plurality of light emitting diode packages and a plurality of light guide pipes.
Figure 9C:
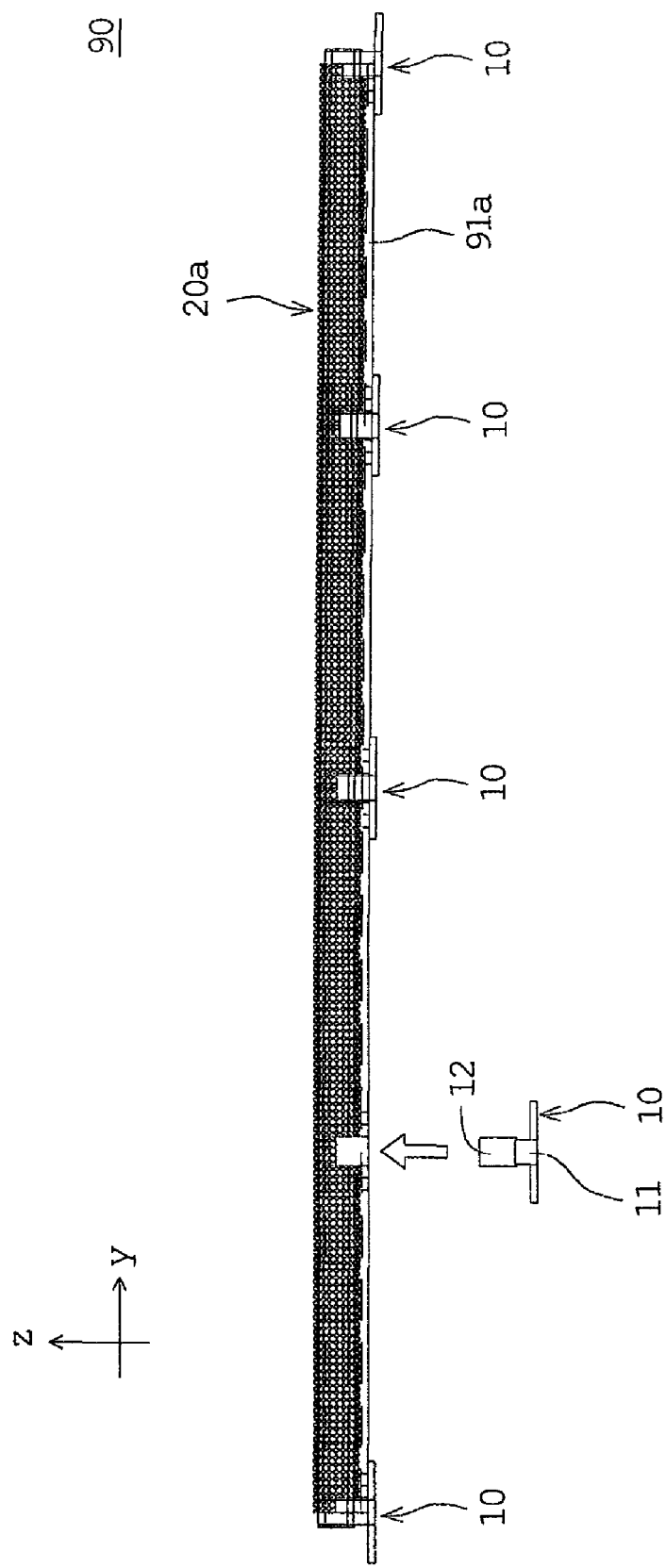
FIG. 9C is a side view of a light emitting diode package and the corresponding light guide pipe in FIG. 9B on the frame.
Figure 9D:
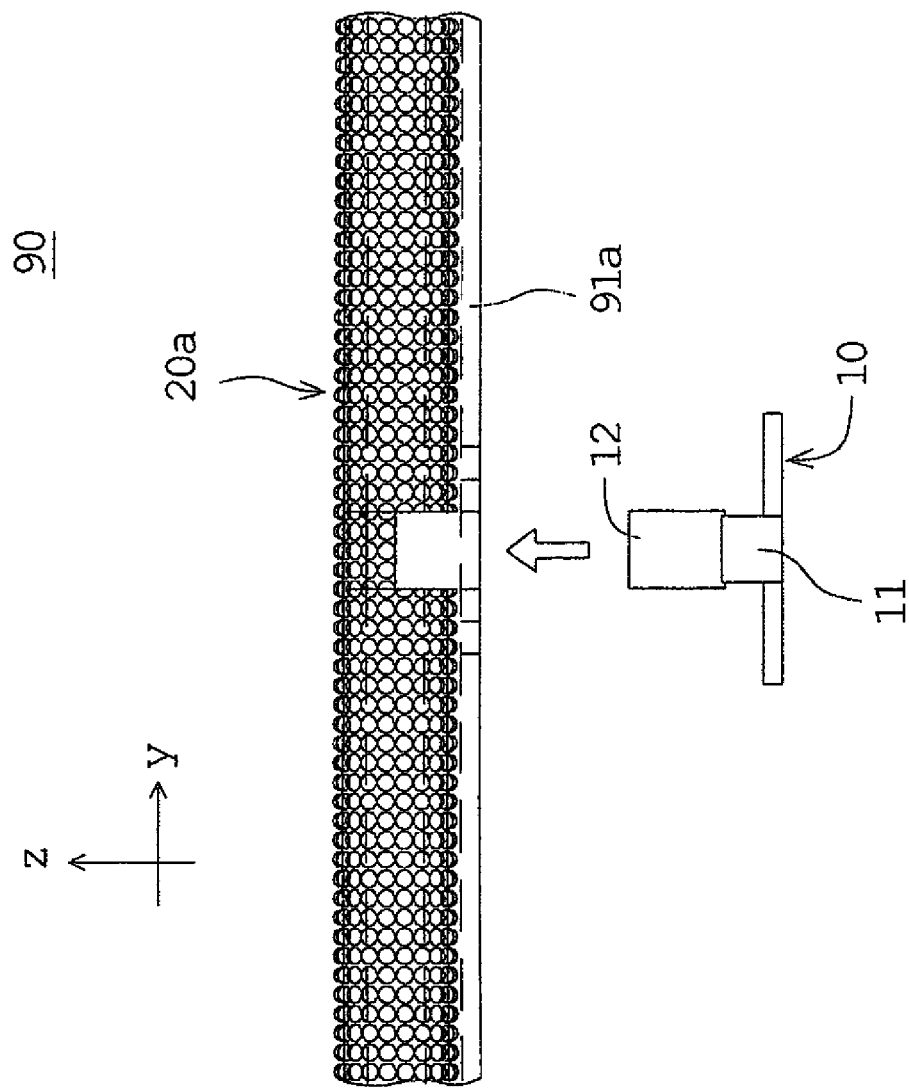
FIG. 9D is a partial magnified view of the light emitting diode package and the light guide pipe in FIG. 9C on the frame.
Figure 9E:
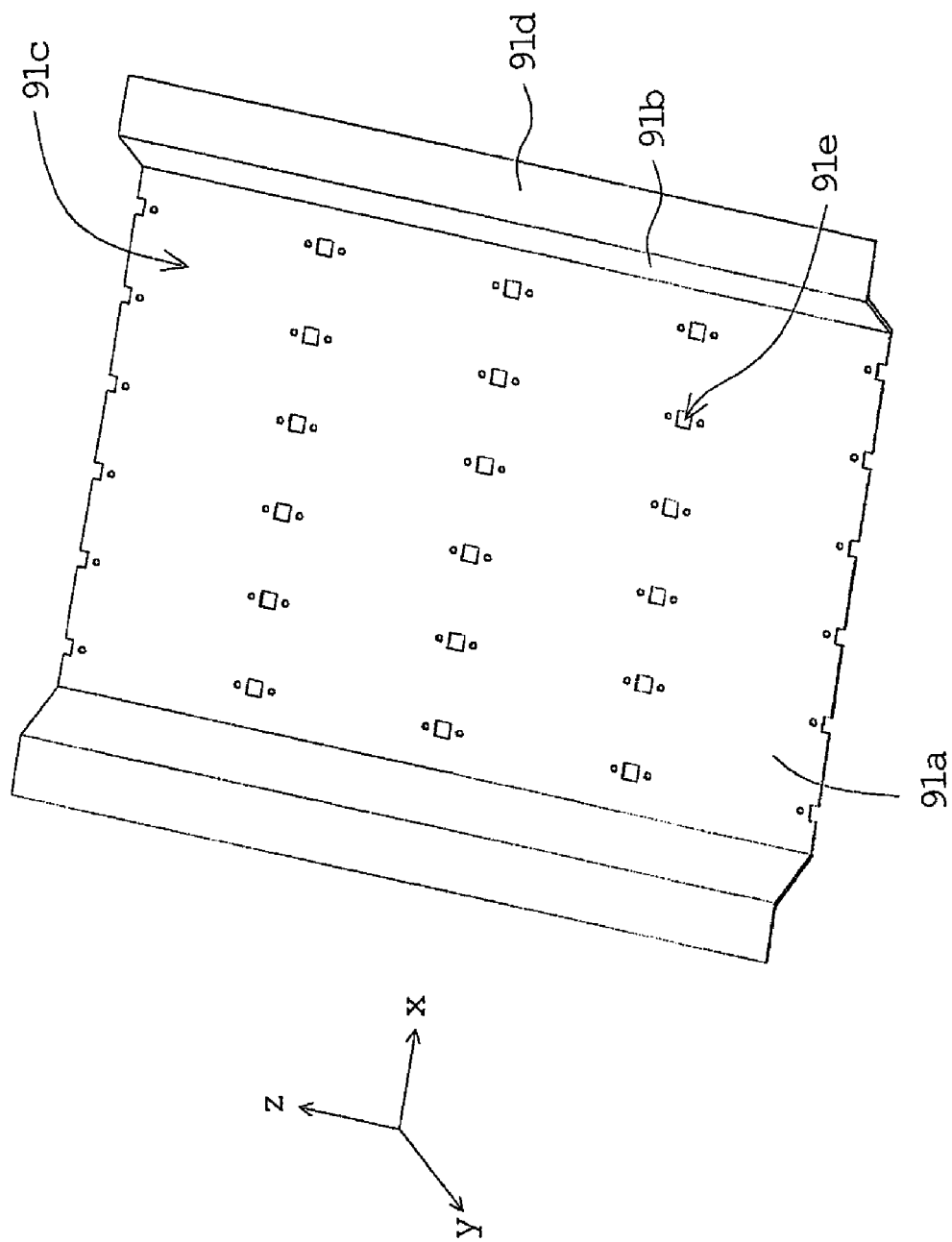
FIG. 9E illustrates the frame in FIG. 9B.

FIG. 9A illustrates a front view of a backlight module according to a ninth embodiment of the invention. FIG. 9B is a three-dimensional view of the backlight module of FIG. 9A which is a combination of a frame, a plurality of light emitting diode packages and a plurality of light guide pipes. FIG. 9C is a side view of a light emitting diode package and the corresponding light guide pipe of FIG. 9B on the frame. FIG. 9D is a partial magnified view of the light emitting diode package and the light guide pipe in FIG. 9C on the frame. FIG. 9E illustrates the frame in FIG. 9B.

As shown in FIGS. 9A~9E, a backlight module 90 includes a frame 91, at least one light guide pipe and at least one light emitting diode package. For example, the backlight module 90 is a direct type backlight module. The light emitting diode package of the backlight module 90 is preferably the light emitting diode package 10 of the first embodiment. The light emitting diode package 10 emits single-direction or two-direction sidelight. The light guide pipe of the backlight module 90 is preferably any light guide pipe of the second to eighth embodiments. A number, e.g., six, of light guide pipes 20a are illustrated as an example in the present embodiment. Each light guide pipe 20a with five light emitting diode packages 10 is illustrated as an example. However, the present invention is not limited thereto and any number of light emitting diode packages and light guide pipes can be used depending on the application. The light emitting diode package 10 and the light guide pipe 20a are illustrated in the first embodiment and the second embodiment, and are not described again.

The frame 91 includes a base board 91a and a side board 91b. The base board 91a and the side board 91b define downwardly concave containing space 91c. The column 21 of each light guide pipe 20a is disposed in the containing space 91c and over the base board 91a. The base 11 of each light emitting diode package 10 is disposed on the base board 91a. As shown in FIGS. 9C~9D, the body 12 of each light emitting diode package 10 penetrates the external circumferential surface 21a and the internal reflection surface 21b of the corresponding light guide pipe 20a, as shown by arrow in FIG. 9D, and then is inserted in the column 21. As a result, the first peripheral recesses 14 and the second peripheral recesses of the three middle light emitting diode packages 10 are coupled to the corresponding areas between the external circumferential surface 21a and the internal reflection surface 21b in the middle region of each light guide pipe 20a. The first peripheral recess 14 and the second peripheral recess of the two end light emitting diode packages 10 located at the ends of each light guide pipe 20a are coupled to the corresponding areas between the external circumferential surface 21a and the internal reflection surface 21b at the ends of the light guide pipe 20a. In each light guide pipe 20a, the middle three light emitting diode packages 10 emit two-direction sidelight to the light guide pipe 20a along the axial direction toward two ends of the light guide pipe 20a. The two end light emitting diode packages 10 emit at least single-direction sidelight to the light guide pipe 20a along the axial direction toward the other end of the light guide pipe 20a.

In the present embodiment, the light emitting diode packages 10 preferably penetrate the base board 91a and then are fastened to the base board 91a. For example, after penetrating the base board 91a, the light emitting diode packages 10 are fastened to the base board 91a by hooking, adhering, screwing, hinging, welding, wedging, riveting or socketing or the like. A screw hole of the base board 91a is preferably a blind hole instead of a through hole. As a result, dust is prevented from entering to the containing space 91c, and light leakage is decreased. As shown in FIG. 9E, the base board 91a has several through holes 91e. Each through hole 91e is arranged for enabling one or more light emitting diode packages to penetrate the base board 91a. As a result, the light emitting diode package 10 can be easily replaced from the back of the backlight module 90. Furthermore, the backlight module 90 includes a reflection film 97 or a reflection layer. The reflection film 97 is disposed on the base board 91a and the side board 91b for reflecting light. The reflection layer can be coated on the base board 91a and the side board 91b for reflecting light also. After penetrating the reflection film 97 or the reflection layer, each light emitting diode package 10 protrudes on the upper surface of the reflection film 97 or the reflection layer. Furthermore, the frame 91 further includes a top board 91d. The top board 91d connects to the base board 91a through the side board 91b. The backlight module 90 further includes a diffusion plate 98. The diffusion plate 98 is disposed on the top board 91d and covers a top opening of the containing space 91c for diffusing light. The backlight module 90 further includes an optical film set 99. The optical film set 99 is disposed on the diffusion plate 98 and includes optical films, such as a diffusion film, a prism film and a light enhancement film, for converting the received light to plane light. The base board 91a, the side board 91b and the top board 91d are preferably formed integrally and include metal or thermally conductive material.

The backlight module 90 of the present embodiment shortens a light mixing distance between the light emitting diode package 10 and the diffusion plate 98 due to the use of the light source module assembled by the light emitting diode packages 10 and the light guide pipes 20a. As a result, the thickness of the backlight module 90 is decreased greatly, and the applicability of the backlight module 90 is increased.

Tenth Embodiment

Figure 10A:
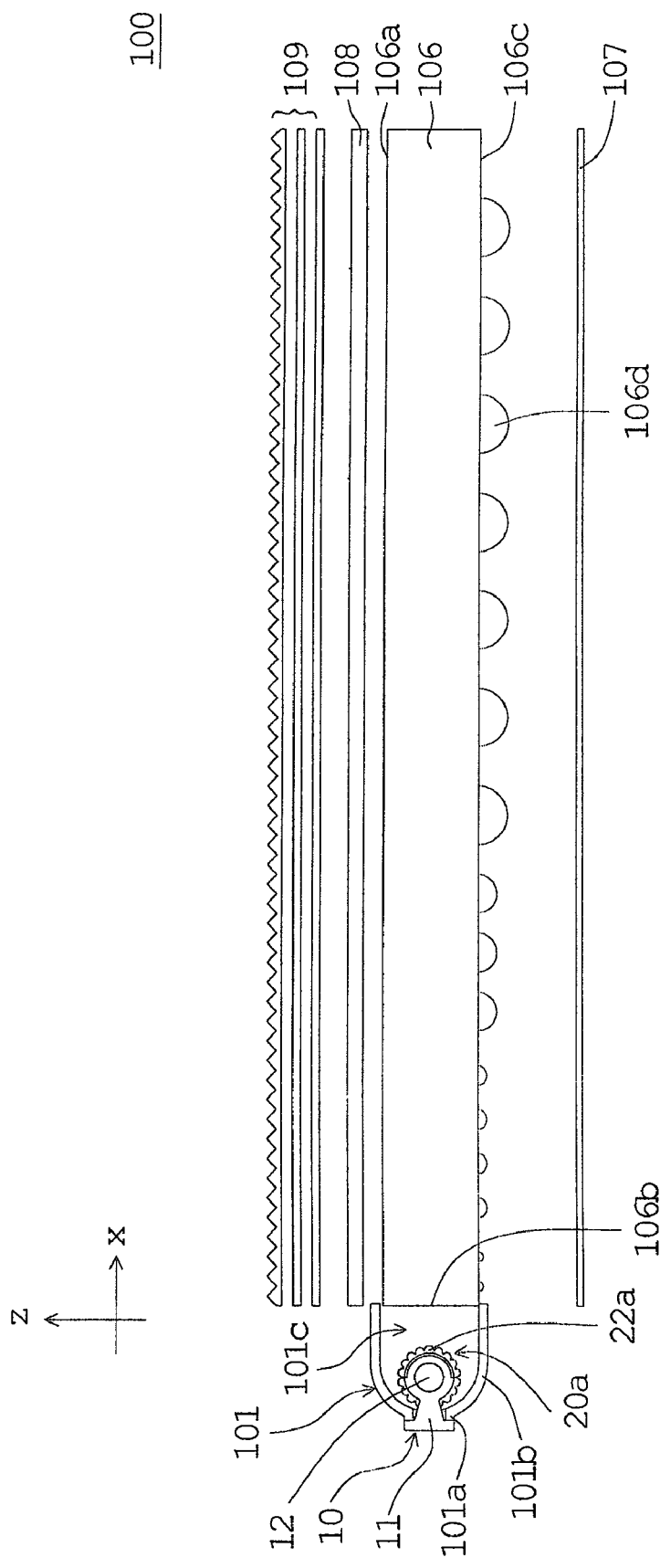
FIG. 10A illustrates a backlight module according to a tenth embodiment of the invention.
Figure 10B:
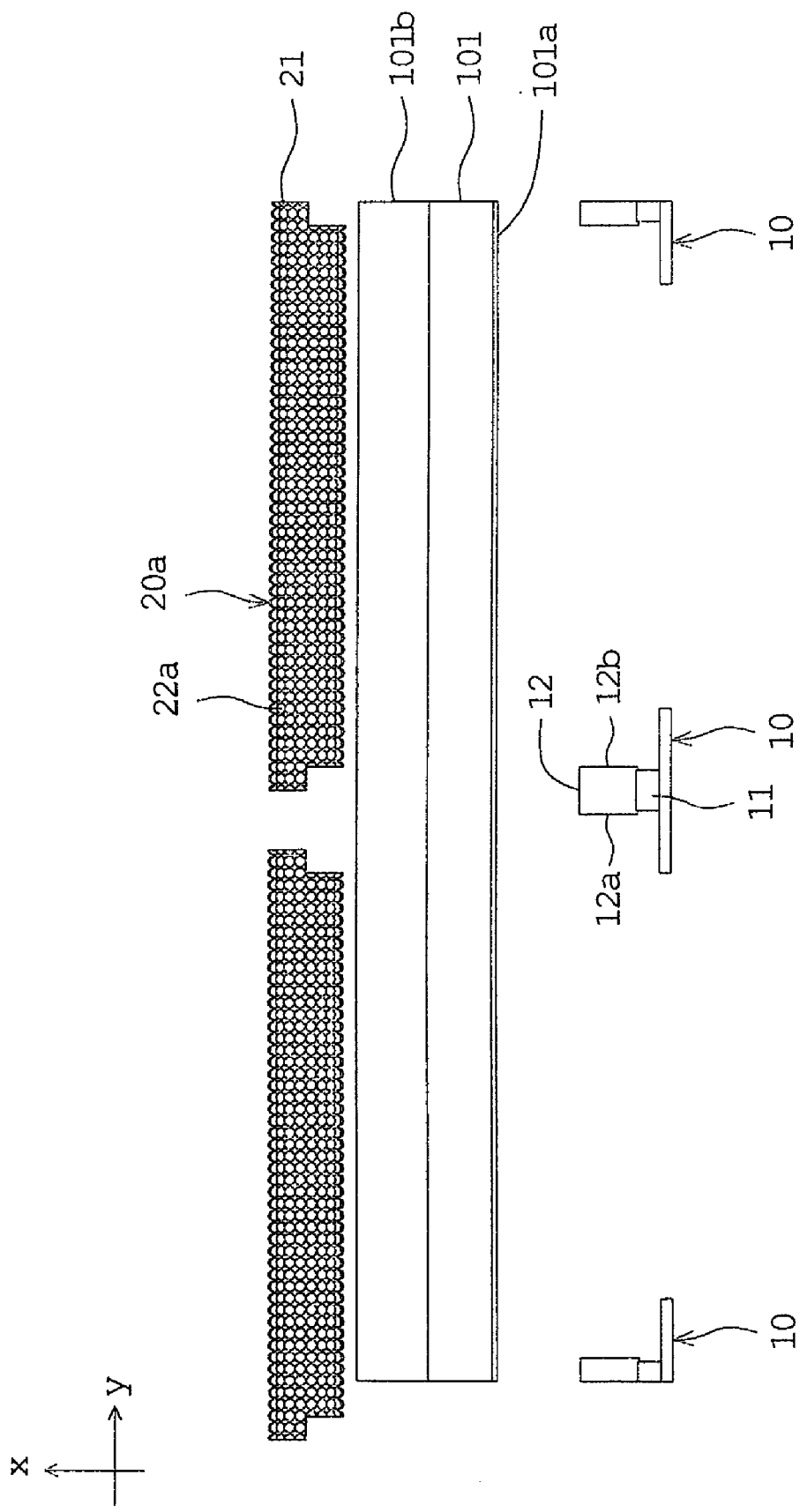
FIGS. 10B~10C are side and front views showing a plurality of light emitting diode packages, a frame and a light guide pipe of the backlight module according to FIG. 10A in a disassembled state.
Figure 10C:
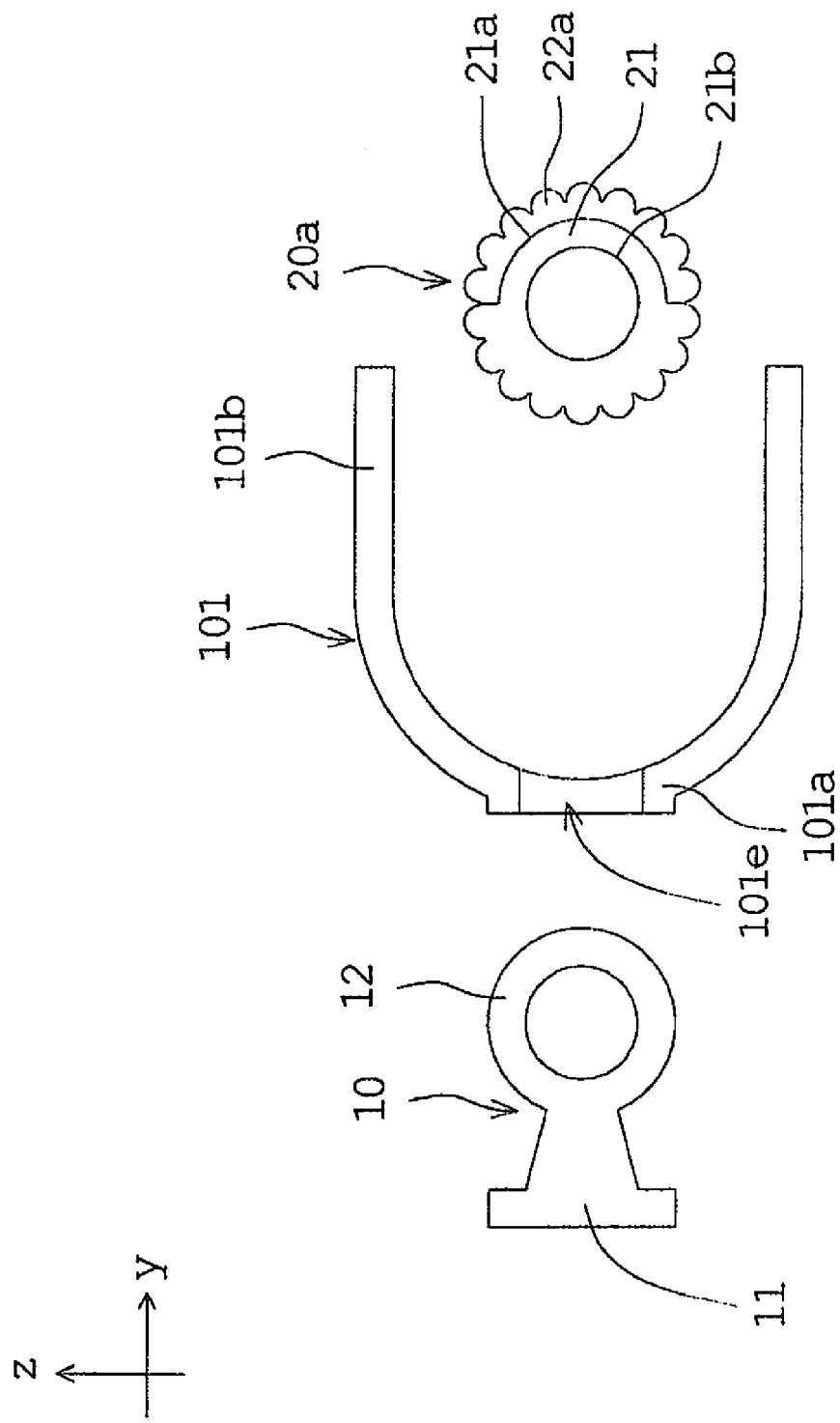
Figure 10D:
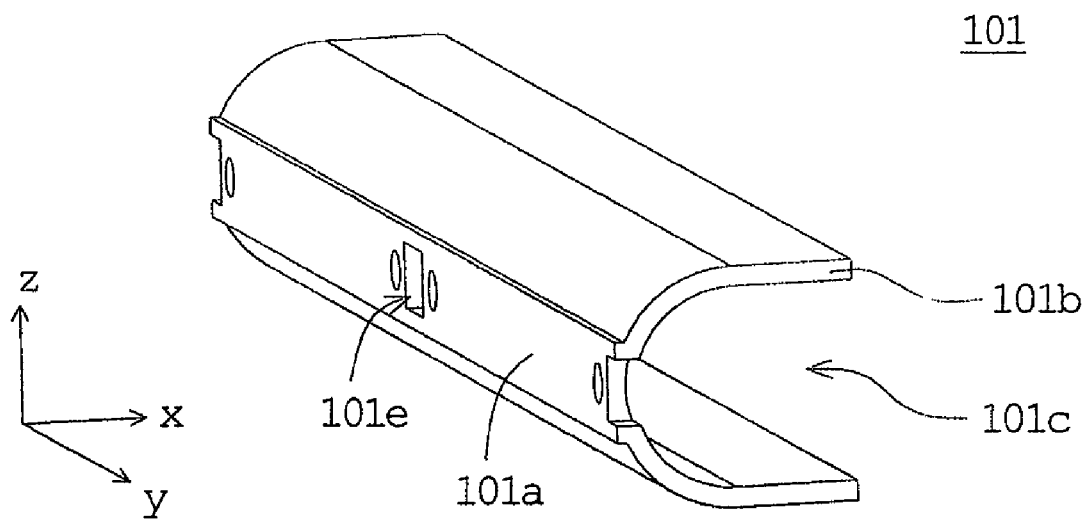
FIG. 10D is a three-dimensional view of the frame in FIG. 10A.

FIG. 10A illustrates a backlight module according to a tenth embodiment of the invention. FIGS. 10B~10C are side and front views showing a plurality of light emitting diode packages, a frame and a light guide pipe of the backlight module according to FIG. 10A in a disassembled state. FIG. 10D is a three-dimensional view of the frame in FIG. 10A. As shown in FIGS. 10A~10D, a backlight module 100 includes a frame 101, at least one light guide pipe and at least one light emitting diode package. For example, the backlight module 100 is a side light type backlight module, and the light emitting diode package of the backlight module 100 is the light emitting diode package 10 of the first embodiment. The light emitting diode package 10 emits single-direction or two-direction sidelight. For example, the light guide pipe of the backlight module 100 is one of the light guide pipes of the second to eighth embodiments. Two light guide pipes 20a are illustrated as an example in the present embodiment. The light guide pipes 20a are used with one middle light emitting diode package 10 emitting two-direction sidelight and two end light emitting diode packages 10 emitting single-direction sidelight as an example in the present embodiment. However, the present invention is not limited thereto and any number of light emitting diode packages and light guide pipes can be used depending on the application. The light emitting diode package 10 and the light guide pipe 20a are revealed in the first and the second embodiments and are not described again.

The frame 101 includes a base board 101a and a side board 101b. The base board 101a and the side board 101b define a concave containing space 101c. The columns 21 of the two light guide pipes 20a are connected in series and are disposed in the containing space 101c. Also, the columns 21 are disposed over the base board 101a. The base 11 of each light emitting diode package 10 is disposed over the base board 101a. As shown in FIGS. 10B~10C, after penetrating the external circumferential surface 21a and the internal reflection surface 21b of the light guide pipe 20a, the body 12 of each light emitting diode package 10 is inserted in the column 21. As a result, the first peripheral recess 14 and the second peripheral recess of the middle light emitting diode package 10 are coupled to the corresponding areas between the external circumferential surfaces 21a and the internal reflection surfaces 21b of the two light guide pipes 20a at their connection. The first peripheral recesses 14 and the second peripheral recesses of the two end light emitting diode packages 10 are coupled to the corresponding areas between the external circumferential surfaces 21a and the internal reflection surfaces 21b at the opposite ends of the two light guide pipes 20a. The middle light emitting diode package 10 emits two-direction sidelight to the two light guide pipes 20a along the axial direction toward the two light guide pipes 20a. The two end light emitting diode packages 10 emit single-direction sidelight to the other light guide pipe 20a along the axial direction of the two light guide pipes 20a.

In the present embodiment, after penetrating the base board 101a, each light emitting diode package 10 is fastened to the base board 101a. For example, after penetrating the base board 101a, the light emitting diode package 10 is fastened to the base board 101a by hooking, adhering, screwing, hinging, welding, wedging, riveting or socketing or the like. Screw holes of the base board 101a are preferably blind holes instead of through holes. As a result, dust is prevented from entering the containing space 101c, and light leakage is decreased. As shown in FIGS. 10C~10D, several through holes 101e are formed on the base board 101a. Each through hole 101e is for enabling part of one or more light emitting diode packages 10 to penetrate the base board 101a. Therefore, the light emitting diode packages 10 can be easily replaced from the back of the backlight module 100 directly. Furthermore, the backlight module 100 includes a light guide plate 106 and a reflection film 107. The light guide plate 106 has a first surface 106a, a second surface 106b and a third surface 106c. The second surface 106b connects with the first surface 106a and the third surface 106c and corresponds to an opening of the containing space 101c. The reflection film 107 is disposed over the third surface 106c for reflection light, so that light entering the light guide plate 106 through the second surface 106b emits out through the first surface 106a. Several pattern dots 106d, such as protruding dots, are formed on the third surface 106c. When closer to the second surface 106b, the pattern dots are smaller and distributed more densely. When farther from the second surface 106b, the pattern dots are bigger and distributed less densely. The backlight module 100 further includes a diffusion plate 108. The diffusion plate 108 is disposed over the first surface 106a for diffusing light. The backlight module 100 further includes an optical film set 109. The optical film set 109 is disposed over the diffusion plate 108 and includes optical films, such as a diffusion film, a prism film or a light enhancement film, for converting the received light to plane light.

Eleventh Embodiment

Figure 11:
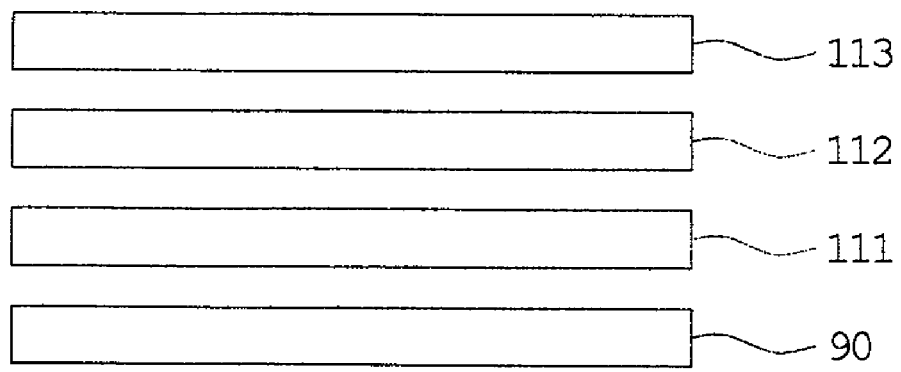
FIG. 11 illustrates a liquid crystal display device according to an eleventh embodiment of the invention.

In FIG. 11, a liquid crystal display device according to an eleventh embodiment of the invention is illustrated. In FIG. 11, a liquid crystal display device 110 includes a first polarizer 111, a liquid crystal display panel 112, a second polarizer 113 and a backlight module. The backlight module of the liquid crystal display device 100 is preferably the backlight module 90 of the ninth embodiment or the backlight module 100 of the tenth embodiment. The backlight module 90 is illustrated in the present embodiment. The first polarizer 111 is disposed over the backlight module 90. The liquid crystal display panel 112 is disposed over the first polarizer 111. The second polarizer 113 is disposed over the liquid crystal display panel 112. Light transmission axes of the first polarizer 111 and the second polarizer 113 are substantially perpendicular to each other.

In the light emitting diode package, the light guide pipe, the backlight module and the liquid crystal display device according to the above embodiments of the invention, the light emitting diode package emits light like a lamp through the scattering effect of the light guide pipe. Therefore, the light source module assembled by the light emitting diode package and the light guide pipe overcomes the limitation of the conventional design of the light source. Furthermore, the backlight module of the present embodiments using such light source module shortens a light mixing distance between the light emitting diode package and the diffusion plate. As a result, the thickness of the backlight module is decreased greatly, and the applicability of the backlight module and the liquid crystal display device is increased. Moreover, it is very easy to directly replace the light emitting diode package from the back of the backlight module through the mounting through holes. Besides, the light emitting diode chips are used as light sources in the present embodiments. The difficulties associated with recycling lamps and the environmental pollution problems due to mercury are resolved. Also, the environment protection requirements are met.

While the invention has been described by way of example and in terms of embodiments, it is to be understood that the invention is not limited thereto. On the contrary, the invention is intended to cover various modifications and similar arrangements and procedures, as defined by the appended claims.

What is claimed is:

1. A light guide pipe, comprising:
   a column having an external circumferential surface and an internal reflection surface for guiding therebetween light received by the light guide pipe along the column; and
   a plurality of light scattering structures disposed between or on at least one of the external circumferential surface and the internal reflection surface for scattering the light received by the light guide pipe and guided along the column between the external circumferential surface and the internal reflection surface;
   wherein the column has a through hole, and the light guide pipe further comprises:
   a reflection pipe inserted into the through hole, said reflection pipe having an external reflective surface that defines the internal reflection surface for reflecting the light guided along the column outwardly, away from the reflection pipe and toward the external circumferential surface.

2. The light guide pipe according to claim 1, wherein the light scattering structures are disposed on the external circumferential surface or adjacent to the internal reflection surface.

3. The light guide pipe according to claim 2, wherein the light scattering structures comprise a plurality of patterned dots.

4. The light guide pipe according to claim 1, wherein the column is a cylinder or a polygonal column.

5. The light guide pipe according to claim 3, wherein the column further comprises a connecting portion adapted to connect to a light source, wherein the pattern dots are smaller when closer to the connecting portion and larger when farther from the connecting portion.

6. The light guide pipe according to claim 3, wherein the pattern dots are circular or polygonal.

7. The light guide pipe according to claim 2, wherein the light scattering structures comprise at least a helical thread.

8. The light guide pipe according to claim 7, wherein said helical thread is continuous or discontinuous.

9. The light guide pipe according to claim 7, wherein the column further comprises a connecting portion adapted to connect to a light source, wherein the pitch of said helical thread is shorter at locations closer to the connecting portion and greater at locations farther from the connecting portion.

10. The light guide pipe according to claim 1, wherein the column comprises, between the external circumferential surface and the internal reflection surface, a tubular structure of light guiding material for guiding the light received by the light guide pipe along the column between the external circumferential surface and the internal reflection surface.

11. A backlight module, comprising:
    a frame comprising a base board and a side board, wherein the base board and the side board define a containing space;
    a light source supported on the base board;
    a light guide pipe, comprising:
    a column disposed in the containing space and over the base board, wherein the column has an external circumferential surface and an internal reflection surface, and wherein said light source is coupled to the column for emitting light into said column at an area between the external circumferential surface and the internal reflection surface; and
    a plurality of light scattering structures disposed between or on at least one of the external circumferential surface and the internal reflection surface for scattering the light received by the light guide pipe from the light source and guided along the column between the external circumferential surface and the internal reflection surface.

12. The backlight module according to claim 11, further comprising:
    a light guide plate having a first surface, a second surface and a third surface, wherein the second surface connects the first surface and the third surface which are opposite surfaces of the light guide plate, the second surface being coupled to receive the light scattered out of the light guide pipe; and
    a reflection film disposed on the third surface for reflecting the light entering the light guide plate through the second surface to the outside through the first surface.

13. The backlight module according to claim 12, further comprising:
    a diffusion plate disposed on the first surface for diffusing the light exiting the light guide plate.

14. The backlight module according to claim 11, comprising:
    a plurality of said light guide pipes arranged in at least a row on the based board; and
    said light source being disposed between two adjacent said light guide pipes for emitting light into and along said adjacent guide light pipes.

15. The backlight module according to claim 11, wherein said column further comprises a cutout portion in which said light source is received for emitting light into and along said guide light pipe toward opposite ends of said column.

16. The backlight module according to claim 11, wherein the column is hollow and has a through hole extending axially of said column, and the light guide pipe further comprises:

a reflection material disposed on an inner wall of the through hole to form the internal reflection surface for reflecting the light guided along the column outwardly, away from the through hole and toward the external circumferential surface.

17. The backlight module according to claim 11, wherein the column is tubular and has a through hole extending axially of said column, and the light guide pipe further comprises:
a reflection pipe inserted into the through hole, said reflection pipe having an external reflective surface that defines the internal reflection surface for reflecting the light guided along the column outwardly, away from the reflection pipe and toward the external circumferential surface.

18. The backlight module according to claim 11, wherein the light scattering structures are disposed on the external circumferential surface or adjacent to the internal reflection surface.

19. The backlight module according to claim 18, wherein the light scattering structures comprise a plurality of pattern dots.

20. The backlight module according to claim 11, further comprising:
a reflection film disposed on the base board and the side board for reflecting light, wherein the light source penetrates through and is protruded on the reflection film.

21. The backlight module according to claim 18, wherein the light scattering structures comprise at least a helical thread.

22. The backlight module according to claim 11, wherein the frame further comprises a top board connected to the base board through the side board, the backlight module further comprises:
a diffusion plate disposed on the top board for diffusing light, wherein the diffusion plate covers an opening of the containing space.

23. The backlight module according to claim 21, wherein said helical thread is continuous or discontinuous.

24. The backlight module according to claim 11, wherein the light source extends through and is fastened to the base board.

25. A liquid crystal display device, comprising:
a backlight module as defined in claim 11,
a first polarizer disposed over the backlight module;
a liquid crystal display (LCD) panel disposed over the first polarizer; and
a second polarizer disposed over the liquid crystal display panel.

* * * * *